United States Patent
Logothetis et al.

(10) Patent No.: US 11,503,668 B2
(45) Date of Patent: *Nov. 15, 2022

(54) APPARATUS AND METHOD FOR CONFIGURING A COMMUNICATION LINK

(71) Applicant: AIRSPAN IP HOLDCO LLC, Boca Raton, FL (US)

(72) Inventors: Andrew Logothetis, Buckinghamshire (GB); Stuart Parrott, Oxfordshire (GB); Michael David Livingstone, Berkshire (GB); Qasim Khan, Slough (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/121,335

(22) Filed: Dec. 14, 2020

(65) Prior Publication Data

US 2021/0100067 A1 Apr. 1, 2021

Related U.S. Application Data

(63) Continuation-in-part of application No. 16/541,044, filed on Aug. 14, 2019, now Pat. No. 10,869,364.

(30) Foreign Application Priority Data

Oct. 5, 2018 (GB) ..................... 1816253

(51) Int. Cl.
*H04W 4/00* (2018.01)
*H04W 88/14* (2009.01)
(Continued)

(52) U.S. Cl.
CPC ............ *H04W 88/14* (2013.01); *G06N 20/00* (2019.01); *H04W 48/17* (2013.01); *H04W 48/20* (2013.01)

(58) Field of Classification Search
None
See application file for complete search history.

(56) References Cited

U.S. PATENT DOCUMENTS 7,978,729 B2 * 7/2011 Moorti ............... H04L 27/2602
370/476
10,869,364 B2 * 12/2020 Logothetis ........... H04B 1/0003
(Continued)

FOREIGN PATENT DOCUMENTS

GB    2564768 A     1/2019
WO    2018068857 A1 4/2018

OTHER PUBLICATIONS

Begashaw et al., "Enhancing Blind Interference Alignment with Reinforcement Learning," IEEE GLOBECOM, Apr. 12, 2016, 7 pages.
(Continued)

*Primary Examiner* — Phirin Sam
(74) *Attorney, Agent, or Firm* — Haynes Beffel & Wolfeld LLP; Andrew L. Dunlap

(57) ABSTRACT

Antenna elements support RF communication over a communication link using frequency channels, RF processing circuits, and configuration circuitry to apply a selected configuration. Each configuration identifies processing circuit to antenna element couplings, and which frequency channel is allocated to each RF processing circuit. A reinforcement learning process is applied to dynamically alter which configuration to apply as a currently selected configuration. The reinforcement learning process maintains a future rewards record having entries that maintain, for an associated combination of link state and configuration, an estimated future rewards indication determined using a discounted rewards mechanism. A selection policy selects a configuration for a current link state, and then a new reward is observed that is dependent on how the selected configu-
(Continued)

ration alters a chosen performance metric for the communication link. The estimated future rewards indication is updated by storing in the associated entry a predicted estimated future rewards indication generated by assuming, when using the discounted rewards mechanism, that all rewards that will be used in future to update the estimated future rewards indication in the associated entry will have the same value as the new reward.

25 Claims, 13 Drawing Sheets

(51) Int. Cl.
G06N 20/00 (2019.01)
H04W 48/00 (2009.01)
H04W 48/20 (2009.01)

(56) References Cited

U.S. PATENT DOCUMENTS

| 2013/0095774 | A1 | 4/2013 | Gulati et al. | |
|---|---|---|---|---|
| 2015/0358337 | A1* | 12/2015 | Keller | H04W 12/128 726/23 |
| 2018/0331581 | A1 | 11/2018 | Hosseini | |
| 2018/0337534 | A1 | 11/2018 | Bell et al. | |
| 2018/0375707 | A1* | 12/2018 | Bala | H04L 27/2605 |
| 2019/0140340 | A1 | 5/2019 | Ramasamy et al. | |
| 2019/0253469 | A1 | 8/2019 | Rubin et al. | |
| 2020/0033849 | A1* | 1/2020 | Yiu | G05D 1/0022 |
| 2020/0077285 | A1 | 3/2020 | Yu et al. | |
| 2020/0077412 | A1* | 3/2020 | Har-Zion | H04W 72/082 |
| 2020/0119592 | A1 | 4/2020 | Hosseini | |

OTHER PUBLICATIONS

GB Search Report from GB1816253.7, dated Feb. 14, 2019, 4 pages.
Gulati, et al., "Learning State Selection for Reconfigurable Antennas: A Multi-Armed Bandit Approach," IEEE Trans. on Antennas and Propagation, vol. 62, No. 3, Mar. 2014, 12 pages.
PCT Search Report and Written Opinion from PCT/GB2019/052306, dated Oct. 28, 2019, 15 pages.
Razavi, et al., "Self-Configuring Switched Multi-Element Antenna System for Interference Mitigation in Femtocell Networks," 2011 IEEE 22nd Int'l Symp on PIMRC, Nov. 9, 2011, 6 pages.
Volos, et al., "Cognitive Engine Design for Link Adaptation: An Application to Multi-Antenna Systems," IEEE Trans. on Wireless Comm., vol. 9, No. 9, Sep. 2010, 12 pages.

* cited by examiner

ID: 11,503,668 B2

APPARATUS AND METHOD FOR CONFIGURING A COMMUNICATION LINK

PRIORITY APPLICATION

This application is a continuation-in-part of co-pending U.S. patent application Ser. No. 16/541,044 filed on 14 Aug. 2019, which application claims priority of UK Patent Application No. 1816253.7 filed on 5 Oct. 2018, which applications are incorporated herein by reference.

BACKGROUND

The present technique relates to an apparatus and method for configuring a communication link.

As more and more users embrace mobile technology, this is placing ever increasing demands on the mobile networks used to support mobile communication. The networks are required to not only support an ever increasing number of devices, but also as the functionality associated with such devices becomes ever more complex, so this has also increased the capacity requirements within the network.

Accordingly, there is a need for network operators to provide increased network coverage, but also to improve network capacity so as to service the high performance demands placed upon the network by users of modern smartphones and the like.

To facilitate this, it is important to seek to optimise the utilisation of any communication link established within the network between devices of the network. To seek to achieve this, a device may be provided with multiple antenna elements that can be used to support radio frequency (RF) communication over such a communication link using multiple frequency channels. Multiple RF processing circuits can then be provided for processing the RF signals associated with those various antenna elements.

When seeking to optimise the utilisation of the communication link, the various antenna elements and RF processing circuits can be configured so that the decision as to which antenna elements are connected to which RF processing circuits, and which frequency channel is allocated to each RF processing circuit can be chosen with the aim of making most efficient utilisation of the communication link.

However, various factors within the network can affect the efficiency of individual communication links over time, and accordingly a static configuration may at certain points in time lead to a loss in efficiency in utilisation of the associated communication link. It would hence be desirable to provide a mechanism that allowed for efficient reconfiguration of the antenna elements and RF processing circuits over time so as to seek to improve the utilisation of the communication link.

SUMMARY

In one example arrangement, there is provided an apparatus comprising: a plurality of antenna elements to support radio frequency (RF) communication over a communication link using a plurality of frequency channels; a plurality of RF processing circuits for processing RF signals; configuration circuitry to apply a selected configuration from a plurality of different configurations, each configuration identifying which RF processing circuit each antenna element is coupled to, and which frequency channel is allocated to each RF processing circuit, wherein the plurality of configurations includes at least one given configuration that identifies, for an uplink communication, multiple RF processing circuits that are allocated the same frequency channel, and are to be used for transmission of RF signals; the configuration circuitry being arranged to employ a reinforcement learning process in order to dynamically alter which of the plurality of different configurations to apply as a currently selected configuration, the reinforcement learning process comprising: maintaining a future rewards record having a plurality of entries, each entry being arranged to maintain, for an associated combination of link state and configuration, an estimated future rewards indication determined using a discounted rewards mechanism; employing a selection policy to select a configuration for a current link state; observing a new reward that is dependent on how the selected configuration alters a chosen performance metric for the communication link; and updating the estimated future rewards indication in the associated entry of the future rewards record in dependence on the new reward, the updating comprising, when the associated entry is first encountered following a reset event, storing in the associated entry a predicted estimated future rewards indication generated by assuming, when using the discounted rewards mechanism, that all rewards that will be used in future to update the estimated future rewards indication in the associated entry will have the same value as the new reward.

In another example arrangement, there is provided a method of operating an apparatus having a plurality of antenna elements to support radio frequency (RF) communication over a communication link using a plurality of frequency channels, and a plurality of RF processing circuits for processing RF signals, the method comprising: employing configuration circuitry to apply a selected configuration from a plurality of different configurations, each configuration identifying which RF processing circuit each antenna element is coupled to, and which frequency channel is allocated to each RF processing circuit, wherein the plurality of configurations includes at least one given configuration that identifies, for an uplink communication, multiple RF processing circuits that are allocated the same frequency channel, and are to be used for transmission of RF signals; causing the configuration circuitry to employ a reinforcement learning process in order to dynamically alter which of the plurality of different configurations to apply as a currently selected configuration, the reinforcement learning process comprising: maintaining a future rewards record having a plurality of entries, each entry being arranged to maintain, for an associated combination of link state and configuration, an estimated future rewards indication determined using a discounted rewards mechanism; employing a selection policy to select a configuration for a current link state; observing a new reward that is dependent on how the selected configuration alters a chosen performance metric for the communication link; and updating the estimated future rewards indication in the associated entry of the future rewards record in dependence on the new reward, the updating comprising, when the associated entry is first encountered following a reset event, storing in the associated entry a predicted estimated future rewards indication generated by assuming, when using the discounted rewards mechanism, that all rewards that will be used in future to update the estimated future rewards indication in the associated entry will have the same value as the new reward.

In a still further example arrangement, there is provided an apparatus comprising: a plurality of antenna element means for supporting radio frequency (RF) communication over a communication link using a plurality of frequency channels; a plurality of RF processing means for processing RF signals; configuration means for applying a selected configuration from a plurality of different configurations, each configuration identifying which RF processing means each antenna element means is coupled to, and which frequency channel is allocated to each RF processing means, wherein the plurality of configurations includes at least one given configuration that identifies, for an uplink communication, multiple RF processing means that are allocated the same frequency channel, and are to be used for transmission of RF signals; the configuration means for employing a reinforcement learning process in order to dynamically alter which of the plurality of different configurations to apply as a currently selected configuration, the reinforcement learning process comprising: maintaining a future rewards record having a plurality of entries, each entry being arranged to maintain, for an associated combination of link state and configuration, an estimated future rewards indication determined using a discounted rewards mechanism; employing a selection policy to select a configuration for a current link state; observing a new reward that is dependent on how the selected configuration alters a chosen performance metric for the communication link; and updating the estimated future rewards indication in the associated entry of the future rewards record in dependence on the new reward, the updating comprising, when the associated entry is first encountered following a reset event, storing in the associated entry a predicted estimated future rewards indication generated by assuming, when using the discounted rewards mechanism, that all rewards that will be used in future to update the estimated future rewards indication in the associated entry will have the same value as the new reward.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
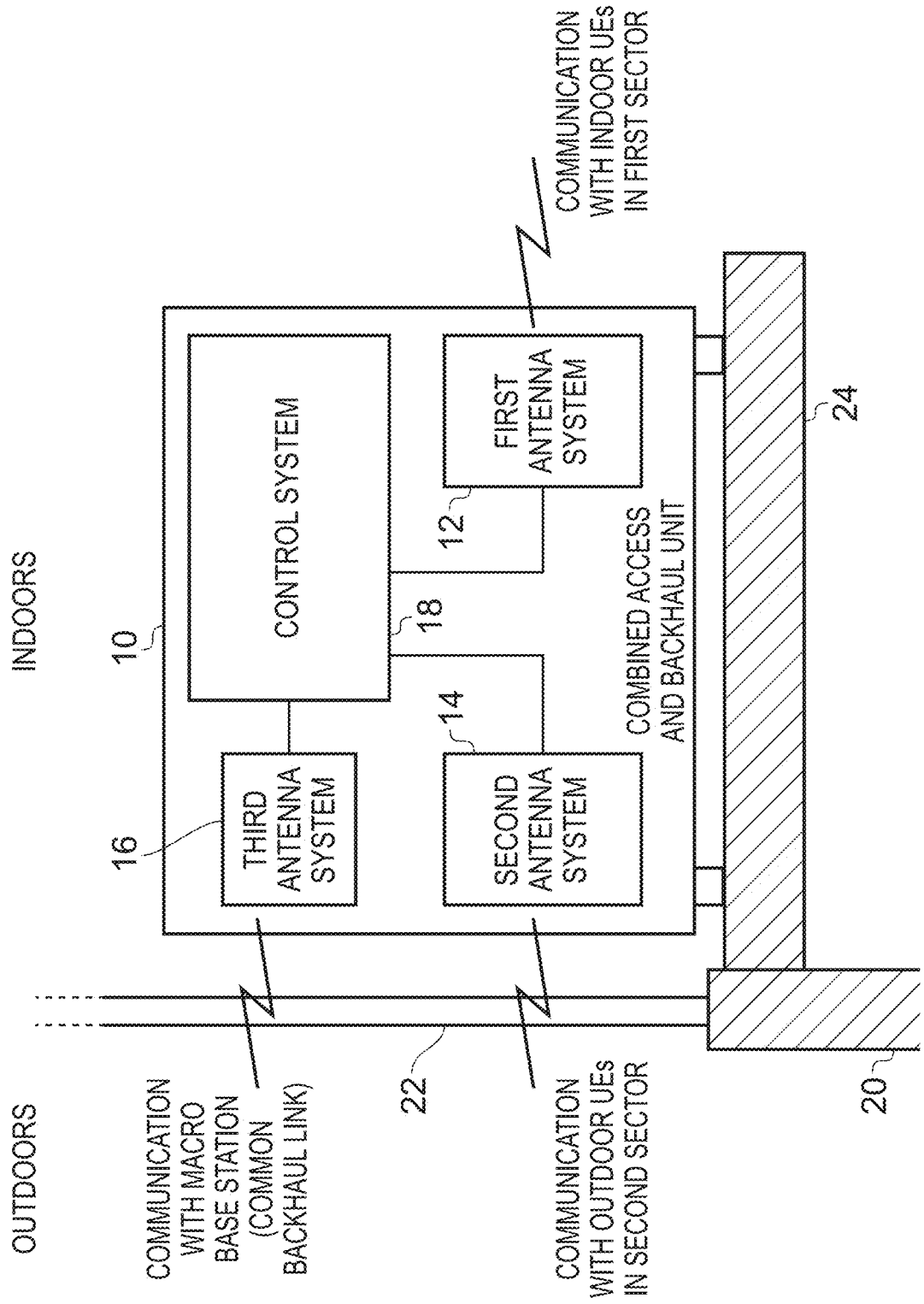
FIG. 1 is a block diagram schematically illustrating an apparatus in accordance with one example arrangement.

In one example, an apparatus is provided that has a plurality of antenna elements that can be used to support radio frequency (RF) communication over a communication link using a plurality of frequency channels. The apparatus also has a plurality of RF processing circuits for processing RF signals, and configuration circuitry that is used to apply a selected configuration from a plurality of different configurations. Each configuration identifies which RF processing circuitry each antenna element is coupled to, and which frequency channel is allocated to each RF processing circuit. Hence, by switching between different configurations, changes can be made as to how the antenna elements are mapped to individual RF processing circuits, and what frequency channels are used by each RF processing circuit. Further, the plurality of configurations includes at least one given configuration that identifies, for an uplink communication, multiple RF processing circuits that are allocated the same frequency channel, and are to be used for transmission of RF signals. By using, for the transmit path, multiple RF processing circuits that have been allocated the same frequency channel, this can allow some interference reducing measures to be implemented, improving performance of the apparatus.

As mentioned earlier, it would be desirable to provide an efficient mechanism to enable the configuration circuitry to switch between the various different configurations with the aim of seeking to optimise a chosen performance metric of the communication link, for example throughput. In order to maximise the benefits available, it would be desirable for such reconfiguration to occur dynamically without user intervention, so as to enable the configuration to be adapted to take account of changing conditions within the network.

Machine learning techniques can be used to assist in this process. However, traditional machine learning techniques can take a significant period of time to learn which configuration is most appropriate even when the network is fairly static, and further may take a significant amount of time to then adapt to changes within the network which affect the chosen performance metric of the communication link.

The techniques described herein use a form of machine learning referred to as reinforcement learning, but incorporate steps within the reinforcement learning process that seek generally to increase the speed of learning, and to increase the speed with which the apparatus can adapt to changing conditions in the network.

In particular, in the described examples, the configuration circuitry is arranged to employ a reinforcement learning process in order to dynamically alter which of the plurality of different configurations to apply as a currently selected configuration. The reinforcement learning process comprises maintaining a future rewards record having a plurality of entries, where each entry is arranged to maintain, for an associated combination of link state and configuration, an estimated future rewards indication determined using a discounted rewards mechanism. In accordance with a discounted rewards mechanism, a discount factor is applied in association with future rewards such that the smaller the discount factor the more weight is given to the more immediate future rewards rather than the more distant future rewards.

The reinforcement learning process then employs a selection policy to select a configuration for a current link state. As will be discussed later, the selection policy will at least make reference to the future rewards record for a certain proportion of the time, but at other times it may make decisions independent of the future rewards record when deciding what configuration to select.

The reinforcement learning process employed by the configuration circuitry then observes a new reward which is dependent on how the selected configuration alters a chosen performance metric of the communication link. The chosen performance metric can take a variety of forms, but could for example be throughput, and the reward can be arranged to correlate with that chosen performance metric. Hence, for the example of throughput, the higher the throughput, the higher the new reward will be. In some instances, the reward value given to the new reward can directly be provided by the observed performance metric.

The reinforcement learning process then updates the estimated future rewards indication in the associated entry of the future rewards record in dependence on the new reward. The associated entry is that entry which is associated with the current link state, and the configuration that was then selected for that current link state, the selected configuration also being referred to herein as a selected "action".

Since the future rewards record is seeking to provide an estimated future rewards indication for various combinations of link state and configuration, so that that estimated future rewards indication can be taken into account when employing the selection policy, it will typically be the case that it could take a significant period of time for the future rewards record to be populated with reliable information. For instance, at a reset event the contents of the future rewards record may be initialised to initial values. Hence, considering a particular entry associated with a combination of link state and configuration, it could take many instances of that link state being observed as the current link state, and the associated configuration being chosen as the new selected configuration, with each such selection producing a new reward that is then used to update the associated entry, before the estimated future rewards indication becomes reliable. Until the future rewards record is populated with reliable information, the learning process is unlikely to select the most optimum configuration in any particular instance, and this can impact the aim of seeking to make most efficient use of the communication link.

However, in accordance with the technique described herein, various mechanisms are implemented in order to seek to improve the speed of learning achieved by the configuration circuitry when employing the reinforcement learning process. In particular, in one example arrangement, when the associated entry is first encountered following a reset event, and it is required to update the estimated future rewards indication to be held in that associated entry based on the new reward, a predicated estimated future rewards indication is generated by assuming, when using the discounted rewards mechanism, that all rewards that will be used in future to update the estimated future rewards indication in the associated entry will have the same value as the new reward. It is often the case that the actual future rewards observed will be similar to the new reward, and hence the above described prediction can provide a reasonably accurate value for the estimated future rewards indication.

Hence, rather than merely updating the entry with the new reward, and relying on future iterations to iteratively update the entry's content until it becomes a reliable indication of the estimated future rewards, the estimated future rewards indication is predicted at the outset, with the predicted estimated future rewards then being stored in the associated entry as the current estimate for the future rewards indication.

It has been found that through such a process, the future rewards record can be populated with reliable information much more quickly, hence accelerating the learning process.

The selection policy can take a variety of forms. However, in one example arrangement the selection policy is a behaviour policy that employs both exploitation and exploration phases based on a chosen ratio, during the exploitation phase the behaviour policy referring to the future rewards record in order to determine the selected configuration, and during the exploration phase the behaviour policy using an alternative technique to choose the selected configuration.

Hence, such a policy ensures that the information built up within the future rewards record can be exploited in order to seek to reliably select the most appropriate configuration having regards to a current link state, whilst still putting time aside to take a more exploratory approach, with the aim of ensuring that configurations that might otherwise not be selected for particular link states given the contents of the future rewards record are still selected every now and then, so that they can continue to be assessed, and the learning process can hence continue to evolve.

In one example arrangement, during the exploitation phase the behaviour policy is arranged to reference the future rewards record in order to identify, from the entries associated with the current link state, an entry having the best estimated future rewards indication, and to then select the configuration associated with that identified entry. The best estimated future rewards indication may be identified in a variety of ways, depending on how rewards are given values, but in one example implementation higher reward values are associated with a higher value of the chosen performance metric, and hence the best estimated future rewards indication is identified as the highest estimated future rewards indication from amongst the entries that are associated with the current link state.

The alternative technique that is used during the exploration phase can take a variety of forms, but in one implementation the alternative technique comprises randomly selecting a configuration from the plurality of configurations. This provides a simple and effective mechanism for ensuring that configurations continue to be assessed, even if they are not the configurations that would naturally be chosen for particular link states based on the current contents of the future rewards record.

The chosen ratio that dictates the split between the time spent on the exploitation phase and the time spent on the exploration phase can take a variety of forms. In one example, it can be fixed, but alternatively it could be varied, and further in some implementations the chosen ratio may vary dependent on the link state.

As mentioned earlier, by calculating a predicated estimated future reward indication in association with an entry that is encountered for the first time following a reset event, it has been found that this can significantly increase the speed of learning. As an additional learning acceleration mechanism, the configuration circuitry may further be arranged when employing the reinforcement learning process to observe a new link state resulting from the selected configuration. The updating may then comprise, when the associated entry has previously been encountered following a reset event, but at least one entry associated with the new link state has not yet been encountered following the reset event, to generate an updated estimated future rewards indication to be stored in the associated entry by combining a current estimated future rewards indication stored in the associated entry with the predicted estimated future rewards indication. Hence, in this instance, even though the associated entry has previously been encountered, at least one of the entries associated with the new link state has not yet been encountered. Hence, this means that the various entries associated with the new link state cannot yet be reliably reviewed in order to produce reward information that could be used to update the associated entry for the current link state.

However, in accordance with the technique described herein, a different approach is taken where, instead, the updated estimated future rewards indication is generated by updating the current estimated future rewards indication that is already stored in the associated entry with a predicted estimated future rewards indication calculated as discussed earlier, i.e. in a way that assumes that all rewards that will be used in future to update the estimated future rewards indication will have the same value as the new reward. It has been found that this process can also more quickly lead to reliable information being stored within the future rewards record, and hence can accelerate the learning process.

The step of combining the current estimated future rewards indication with the predicted estimated future rewards indication can be performed in a variety of ways, but in one example arrangement comprises performing a weighted averaging of the current estimated future rewards indication stored in the associated entry and the predicted estimated future rewards indication.

In one example arrangement, the updating process used to update the estimated future rewards indication in the associated entry comprises, when the associated entry for the current link state and all active entries associated with the new link state have previously been encountered following the reset event, generating an updated estimated future rewards indication to be stored in the associated entry by combining a current estimated future rewards indication stored in the associated entry with an adjustment value determined from the new reward and the maximum estimated future rewards indication for an entry associated with the new link state.

Hence, when the associated entry for the current link state has already been encountered, and all of the active entries associated with the new link state have also previously been encountered, then no prediction of the estimated future rewards is made, and instead the estimated future rewards indication is updated using the current contents in the associated entry, the new reward value, and estimated future rewards information obtained from a chosen entry associated with the new link state, more particularly the entry associated with the new link state that has the largest estimated future rewards indication at that point. The reason that information is used is due to the fact that when selecting the next configuration based on the new link state, then assuming the selection policy is currently in the exploitation phase, it is the configuration that is associated with the entry having the largest estimated future rewards indication (from amongst the entries associated with the new link state) that will be chosen.

It should be noted that not all entries within the future rewards record will necessarily be active entries. For example, in some situations, certain entries can be marked as invalid, since it may be known that some configurations may not be valid, or at least not be desirable options, for a given link state. As a further example, during the exploratory phase, certain configurations may be ignored since we may a-priori have knowledge that the new link state and possibly all future states, may never yield higher rewards than other configurations.

As with the combining step discussed earlier, the combining step used to combine the current estimated future rewards indication with the adjustment value can take a variety of forms, but in one arrangement involves performing a weighted averaging of the current estimated future rewards indication and the adjustment value.

The weighted averaging can take a variety of forms, but in one example arrangement is performed using a learning rate indication such that the current estimated future rewards indication is given a higher weighting when a learning rate is lower.

Hence, the learning rate can be chosen so as to select the weighting given to the current contents of the future rewards record and the weighting given to the new reward information generated based on the new reward.

As another mechanism to seek to increase the speed of learning, and hence accelerate the learning process, the configuration circuitry can be arranged to adjust the learning rate during performance of the reinforcement learning process. In particular, in one example arrangement the configuration circuitry is further arranged when employing the reinforcement learning process to perform a learning rate update operation to adjust the learning rate between upper and lower defined bounds in dependence on a difference between the current estimated future rewards indication stored in the associated entry and a predicted estimated future rewards indication.

Hence, once an entry has been initially populated, which as discussed earlier will involve the use of a predicted estimated future rewards indication, an assessment can be made as to whether the current learning rate should be increased or decreased. In particular, at this point, the current contents of the associated entry (which provide the current estimated future rewards indication prior to any update based on the new reward) can be compared with a predicted estimated future rewards indication in order to determine the extent to which the two differ. The predicted estimated future rewards indication can take a variety of forms. However, in one particular implementation, in order to enable the most appropriate comparison with the current estimated future rewards indication (which as mentioned earlier is the value that exists prior to any update based on the new reward), the predicted estimated future rewards indication is based on the previous reward observed prior to the new reward, i.e. a reward that would have been used when updating the contents of the associated entry in order to give rise to the current estimated future rewards indication that is stored therein.

In one example arrangement, performance of the learning rate update operation causes the learning rate to increase when the difference between the current estimated future rewards indication stored in the associated entry and the predicted estimated future rewards indication is above a threshold.

In one example arrangement, the learning rate update operation is otherwise biased towards reducing the learning rate, and indeed in one example the learning rate is initialised to the lower defined bound. The learning rate can hence then increase if the above mentioned difference is above a threshold, but thereafter, once the difference drops below the threshold, the learning rate can be reduced again. Checks can be made that any adjustment to the learning rate keeps it within the lower and upper defined bounds.

Whilst the above-described mechanisms provide for a significantly accelerated learning process, thus improving efficiency in the utilisation of the communication link, situations can arise that can impact the learning process, and affect the applicability of the information maintained within the future rewards record. Accordingly, in one example arrangement, the configuration circuitry may be arranged to reinitialise the reinforcement learning process upon occurrence of the reset event, reinitialising of the reinforcement learning process causing at least the entries in the future rewards record to be set to an initial value. In implementations that also use the above discussed adaptive learning rate mechanism, then the re-initialisation of the reinforcement learning process can also cause the learning rate to be reset to an initial value, for instance to the lower defined bound in the specific example given earlier.

Due to the fact that the earlier described mechanisms lead to a very fast and efficient learning process, it has been found that there can be certain situations where it is better to reset the mechanism, rather than wait for the reinforcement learning process to adapt. In particular, given that when employing the techniques described herein the initial lead time following initialisation of the reinforcement learning process before reliable configuration information can be learnt is small, the impact of reinitialising the learning process is reduced, and hence it can be useful in some situations to reinitialise the reinforcement learning process.

The reset event can take a variety of forms, but in one example implementation the reset event is caused by at least one of: (i) movement of the apparatus beyond a determined threshold amount; (ii) one or more trigger events associated with an adverse effect on link quality; (iii) a periodic trigger event associated with elapse of a chosen time period.

The initial value to which the entries in the future rewards record are set on reinitialising of the reinforcement learning process can take a variety of forms. However, the initial value for each valid entry may be chosen so as to identify that valid entry as having not yet been encountered. In a further enhancement, that initial value is chosen to be a very large value, for example a value interpreted as being infinity. By such an approach, then the earlier described mechanism by which an entry associated with a current link state is chosen will naturally cause configurations to be selected for entries that have not yet been encountered. Hence, during the early stages of the learning process, then even when in the exploitation phase, the exploitation mechanism will effectively be implementing an exploration, by being biased towards selecting entries that have not yet been encountered, and hence selecting configurations for link states that have not yet been chosen.

There are a number of ways in which the current link state can be determined, but in one example arrangement the configuration circuitry is arranged, when employing the reinforcement learning process, to observe link state information for the communication link in order to determine the current link state. The link state information can take a variety of forms, and may consist of a single piece of information or multiple different pieces of information. As a specific example, any combination of uplink control information (UCI), Reference Signal Received Power (RSRP), Reference Signal Received Quality (RSRQ) or Carrier to Interference plus Noise Ratio (CINR) may be used.

The communication link for which the above described reinforcement learning process is applied can take a variety of forms, but in one specific example arrangement the communication link provides a backhaul connection from the apparatus to a base station. In particular, it can be useful in association with such a backhaul connection to provide multiple antenna elements and multiple RF processing circuits, and to facilitate the variable configurability discussed earlier, and in such instances the above-described reinforcement learning process can significantly improve the efficient utilisation of the communication link. However, there is no requirement for the communication link to be a backhaul link, and in other example implementations access links between the apparatus and one or more items of user equipment may also be subjected to the reinforcement learning process discussed herein.

The configuration circuitry may be arranged to perform the reinforcement learning process in order to dynamically change the configuration either for a downlink communication path over the communication link, an uplink communication path over the communication link, or both downlink and uplink communication paths over the communication link.

Hence, if desired, the technique could be restricted to configuration of the downlink communication path or be restricted to configuration of the uplink communication path. However, in an alternative embodiment, both downlink and uplink communication paths can be simultaneously subjected to the reinforcement learning process. In that particular example, any selected configuration will actually correspond to a particular configuration used for the downlink and a particular configuration used for uplink. Accordingly, in that instance, it will be seen that the total number of configurations will increase. Nevertheless, the above-described reinforcement learning process can still be used in order to seek to select optimum downlink and uplink communication path configurations at any particular point in time.

It should be noted that, in an example implementation, the reward at any time instant is a scalar positive value. In the combined downlink and uplink case, the reward may be derived using a linear combination of the downlink reward and the uplink reward. If uplink is to be favoured, for example in scenarios where more data is to transmitted to the network, then a greater weighting may be applied on the uplink reward rather than the downlink reward.

As mentioned earlier, the plurality of configurations may include at least one given configuration that identifies, for an uplink communication, multiple RF processing circuits (in some instance two, but in other instances more than two) that are allocated the same frequency channel, and are to be used for transmission of RF signals. In one example implementation the given configuration may couple each of the multiple RF processing circuits to different antenna elements. This can be useful for improving performance in a variety of situations. For example, this may allow a transmit diversity scheme to be used to seek to reduce interference. In particular the Cyclic Delay Diversity (CDD) scheme can be used in order to transform spatial diversity into frequency diversity. The aim of this scheme is to mitigate inter-symbol interference by delaying the signals on different antenna elements. CDD can be a particularly beneficial technique to use when the signal is transmitted on different antenna elements having the same antenna polarisation.

In an alternative implementation the given configuration may be arranged to couple each of the multiple RF processing circuits to a same antenna element. Hence again the same polarity will be used for the transmitted signals since the same antenna element is used, and in some instances it may be possible to achieve CDD interference reduction benefits by arranging the multiple RF processing circuits to transmit with different relative timings.

Particular examples will now be described with reference to the Figures.

As mentioned earlier, the techniques described herein can be applied to any suitable communication link within a wireless network, but for the purpose of the following description of an example implementation the technique will be applied to a communication link which provides a backhaul connection from an apparatus to a base station. For the purpose of illustration the apparatus in which the techniques are applied will be an apparatus providing separate access antenna systems for two sectors, and a backhaul antenna system to handle backhaul traffic for both access antenna systems, but it will be appreciated that the techniques described herein in connection with the backhaul link could be employed in any apparatus providing a backhaul link.

FIG. 1 schematically illustrates an apparatus 10 as used in one example implementation. Herein, the apparatus will also be referred to as a combined access and backhaul unit. As shown, the combined access and backhaul unit 10 may in one embodiment be positioned adjacent to a periphery 20, 22 of a building. In one particular embodiment, it is located on a windowsill 24 adjacent to a window 22 at the periphery of the building.

The combined access and backhaul unit 10 has a number of distinct antenna systems. In particular, a first antenna system 12 is used to provide a first sector of the network that extends into the building so as to provide enhanced availability of the network to items of user equipment within the building. To access the network for any items of user equipment that connect via the first antenna system, it is necessary to connect the apparatus 10 into the network. This is achieved through use of the third antenna system 16, which is arranged to establish a backhaul link with a base station of the network. Since such a base station will typically be provided externally to the building, the third antenna system is arranged to generate at least one beam pattern that propagates through the window 22 to establish a wireless backhaul link with the base station.

Modern telecommunications Standards, such as the LTE Standard, allow for high-speed wireless communication with items of user equipment. However, the signals propagated from the base stations typically do not have good indoor penetration. By placing the apparatus 10 at a periphery of a building, a good quality link can typically be established via the third antenna system to a base station of the network, with the use of the first antenna system 12 then allowing for a first sector of coverage to be established that extends into the building to provide enhanced availability of the network inside the building.

However, in addition, in urban environments it is also often the case that items of user equipment in the open environment, for example belonging to users moving around at street level between buildings, can experience poor connectivity. For example, pockets of poor network coverage may develop, due to shadowing from buildings and the like, and even in areas where there is network coverage, the link quality established with the base station may be relatively poor. This can result not only in reduced quality of service observed by certain users, but also can degrade the overall spectral efficiency of the network due to the less efficient utilisation of the available network spectrum that can result from use of such poor quality links.

To address this problem, the combined access and backhaul unit 10 provides an additional antenna system, namely the second antenna system 14, which provides a second sector of the network, the second antenna system generating at least one beam pattern that propagates through the periphery 22 to facilitate communication with at least one item of user equipment external to the building. Hence, through use of the second antenna system, the combined access and backhaul unit 10 can re-radiate network coverage externally to the building, such that items of user equipment external to the building and falling within the coverage area of the second sector are now provided with a further connection option for connecting into the network.

For any users that connect to the apparatus 10 via either the first antenna system or the second antenna system, then the third antenna system is used to provide a common wireless backhaul link back into the network. By such an approach, it is possible to establish good quality links with items of user equipment in both the first and second sectors, through use of the respective first and second antenna systems. In combination with a good quality backhaul link provided by the third antenna system to a macro base station of the network, this can result in the various items of user equipment connected to the network via the apparatus 10 being provided with higher quality links into the network, allowing for more efficient use of the available network spectrum when compared with a situation where those items of user equipment instead establish a direct connection to a macro base station of the network. As a result, the overall spectral efficiency of the network can be increased.

It should be noted that if desired the apparatus 10 could be mounted externally to the building at the periphery, in which case the first antenna system would generate at least one beam pattern that propagates through the periphery into the building, whilst the second and third antenna systems' beam patterns would no longer need to propagate through the periphery. However, for the following description, it will be assumed that the apparatus 10 is provided internally at the periphery of the building. This can enable a reduction in the cost of the apparatus, by avoiding the need to weatherproof the housing, and also provides for significantly simplified deployment. In one particular embodiment, the apparatus 10 is shaped so that it can readily be placed on a windowsill or the like within the building, this providing a very convenient location where it does not get in the way of users going about their business inside the building, and where it is likely that a strong connection with the base station of the network can be established.

Each of the antenna systems 12, 14, 16 will include not only an array of antenna elements used to transmit and receive the RF signals, but also the associated RF stage circuit elements that process the transmitted and received RF signals. In addition, each of the antenna systems will have associated baseband stage (i.e. digital signal processing stage) circuits for processing the transmit signals prior to them being converted into RF signals, and to process received signals after they have been converted from RF signals into baseband signals. These baseband stage circuits can be considered to be provided as part of the antenna system blocks 12, 14, 16, or may be considered to be part of the associated control system 18 that controls the operation of the various antenna systems, and the interactions between them. The control system 18 will provide all of the required control functionality for the different antenna systems, as well as controlling the routing of signals between the antenna systems so that signals received via the first and second antenna systems from items of user equipment can be routed through the third antenna system over the backhaul link to the network, and conversely signals to be propagated to those items of user equipment that are received over the backhaul link by the third antenna system can be routed to the appropriate first and second antenna systems for transmission to the required items of user equipment.

It should be noted that FIG. 1 is not intended to illustrate how the various components are laid out within the combined access and backhaul unit 10, but instead is merely a schematic illustration of the different antenna systems and associated control system. By way of example, whilst the third antenna system 16 is shown above the second antenna system 14, in one embodiment the second and third antenna systems are actually placed side by side, and hence when considering the vertical elevation view of the apparatus 10 as shown in FIG. 1, one of the second and third antenna systems would reside behind the other.

Figure 2:
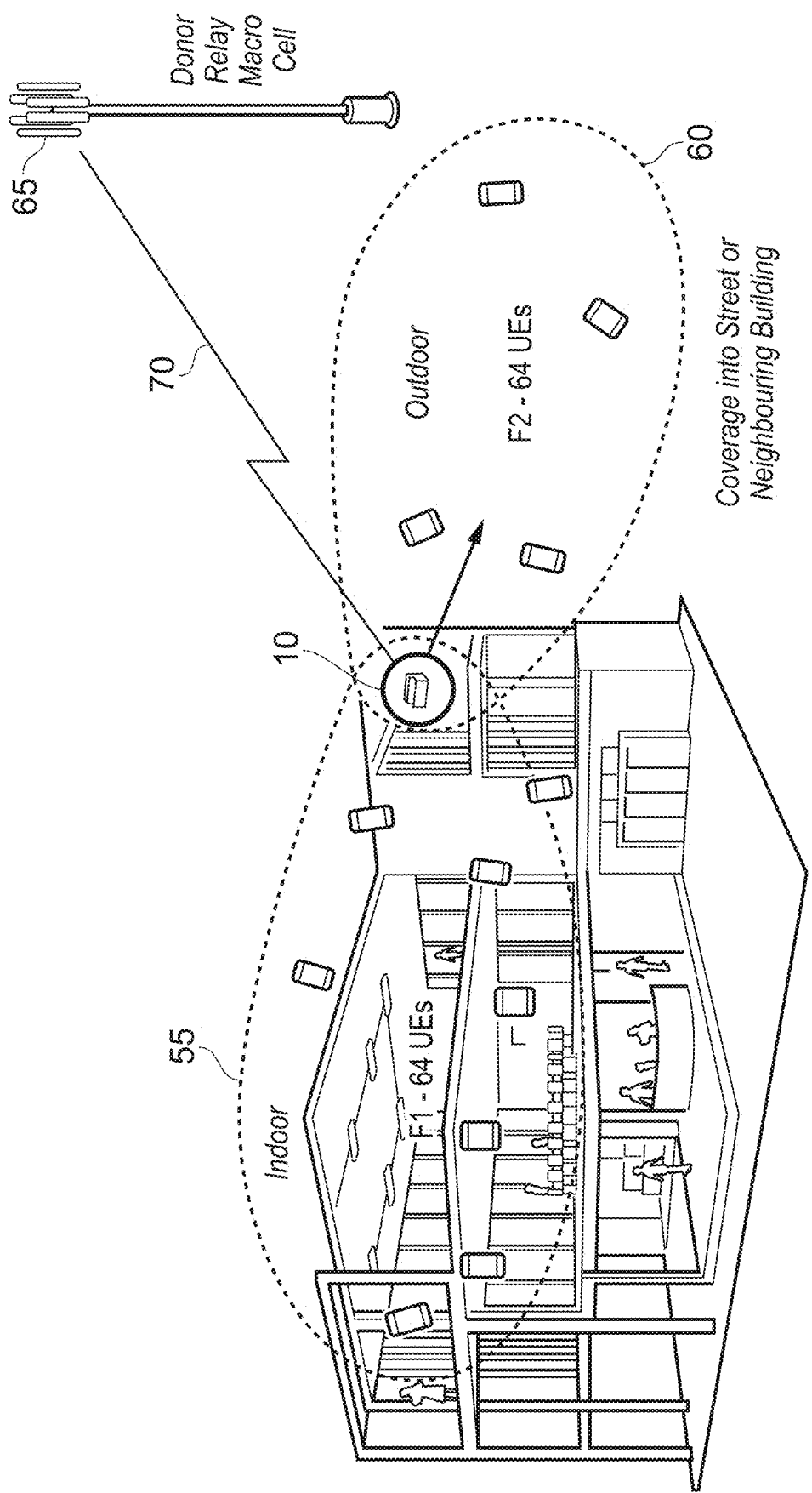
FIG. 2 illustrates how the apparatus of FIG. 1 can be used to create indoor and outdoor sectors in accordance with one example arrangement.

FIG. 2 schematically illustrates how the apparatus 10 may be used to establish both indoor and outdoor sectors for connection of items of user equipment. In particular, as shown, the combined access and backhaul unit 10 can be arranged to produce a first sector 55 of coverage through the beam pattern(s) employed by the first antenna system, and in addition can create an outdoor sector of coverage 60 through the beam pattern(s) deployed by the second antenna system 14. A common wireless backhaul link 70 can then be established by the third antenna system 16 communicating with a macro base station 65, also referred to herein as a donor relay macrocell, or a donor eNodeB (DeNB).

The first, second and third antenna systems can be arranged in a variety of ways, but in one embodiment each of those three antenna systems comprises an array of antenna elements, which are configured in a manner to allow an increase in spectral efficiency of the network when items of user equipment connect to the network via the apparatus 10 rather than connecting directly to a macro base station such as the illustrated base station 65. Since the apparatus is not a handheld device like normal items of user equipment, it is not constrained by size and power factors that would typically constrain the antennas within such handheld user devices. Hence, the array of antenna elements used in the various first, second and third antenna systems can be provided with characteristics that allow a more efficient modulation of signals than may be possible using the antenna system of an item of user equipment connecting to the apparatus 10.

For example, more antenna elements may be provided within each of the arrays, those antenna elements can be of a larger size, the antenna elements may be operated with higher power, and/or may be configured to provide higher gain, than would typically be the case for antenna elements within handheld items of user equipment. As a result, it has been found that a significant number of items of user equipment can connect to each combined access and backhaul unit 10, whilst providing good quality links into the network through the common wireless backhaul link 70. This can lead to a significant increase in the overall spectral efficiency of the network when compared with the situation where each of those items of user equipment individually connected to a macro base station of the network, for example by allowing more efficient modulation schemes to be used for the communications. In one embodiment up to 128 items of user equipment may be connected into each combined access and backhaul unit 10, and as schematically illustrated in FIG. 2 this could for example allow 64 items of user equipment to connect via the indoor sector 55 and another 64 items of user equipment to connect via the outdoor sector 60.

Figure 3:
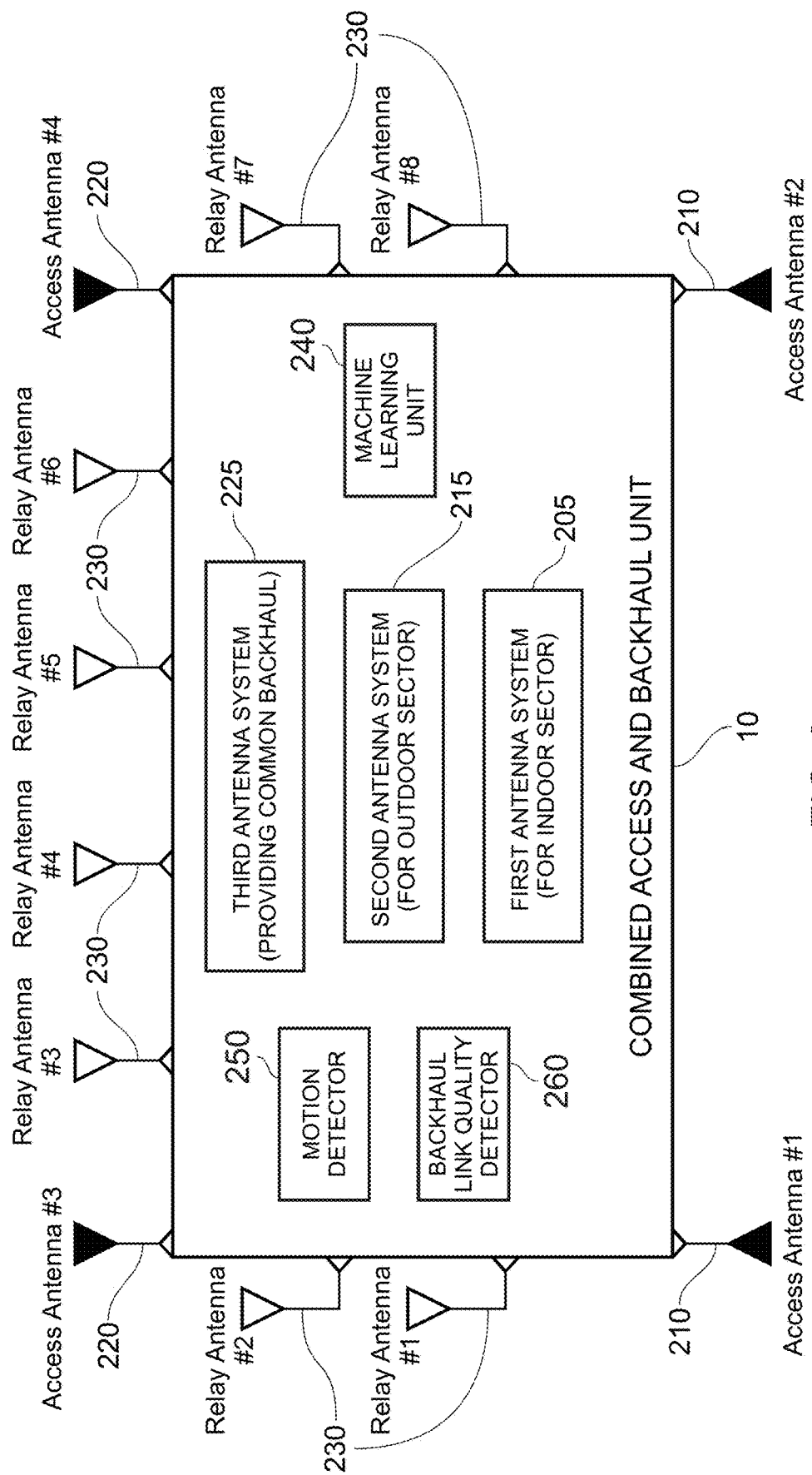
FIG. 3 is a diagram illustrating in more detail components that may be provided within the combined access and backhaul unit in accordance with one example arrangement.

FIG. 3 is a block diagram illustrating in more detail some of the functionality that may be provided within the combined access and backhaul unit 10 in accordance with one example implementation. In contrast to the earlier discussed FIG. 1, the antenna elements are shown separately to the remaining components of each antenna system. Each of the first, second and third antenna systems 205, 215, 225 may be provided with directional antenna elements 210, 220, 230, respectively. Hence, in this particular example, two directional antenna elements 210 are associated with the first antenna system 205 to create a first sector of the network that extends into the building, and in addition two directional antenna elements 220 are associated with the second antenna system 215 to create a second sector of the network that extends externally to the building. In addition, eight directional antenna elements 230 are provided in association with the third antenna system 225, along three of the four sides of the combined access and backhaul unit 10, in order to establish a common wireless backhaul link for the first and second sectors.

As will be discussed in more detail later, machine learning unit 240 is provided within the combined access and backhaul unit for performing the earlier discussed reinforcement learning process in order to alter how the antenna elements 230 of the third antenna system 225 are used so as to seek to optimise a chosen performance metric of the backhaul communication link. In one example arrangement, the chosen performance metric may be throughput (for example in terms of bits per modulated symbol or any other suitable measure). However, in other examples different performance metric may be chosen, for example a delay measurement for propagation of signals, where the aim would be to minimise the observed delay.

As will also be discussed in more detail later, a reset event may be used to reinitialise the reinforcement learning process, and the motion detector 250 and/or the backhaul link quality detector 260 may be used to identify situations where such a reset is appropriate.

Figure 4:
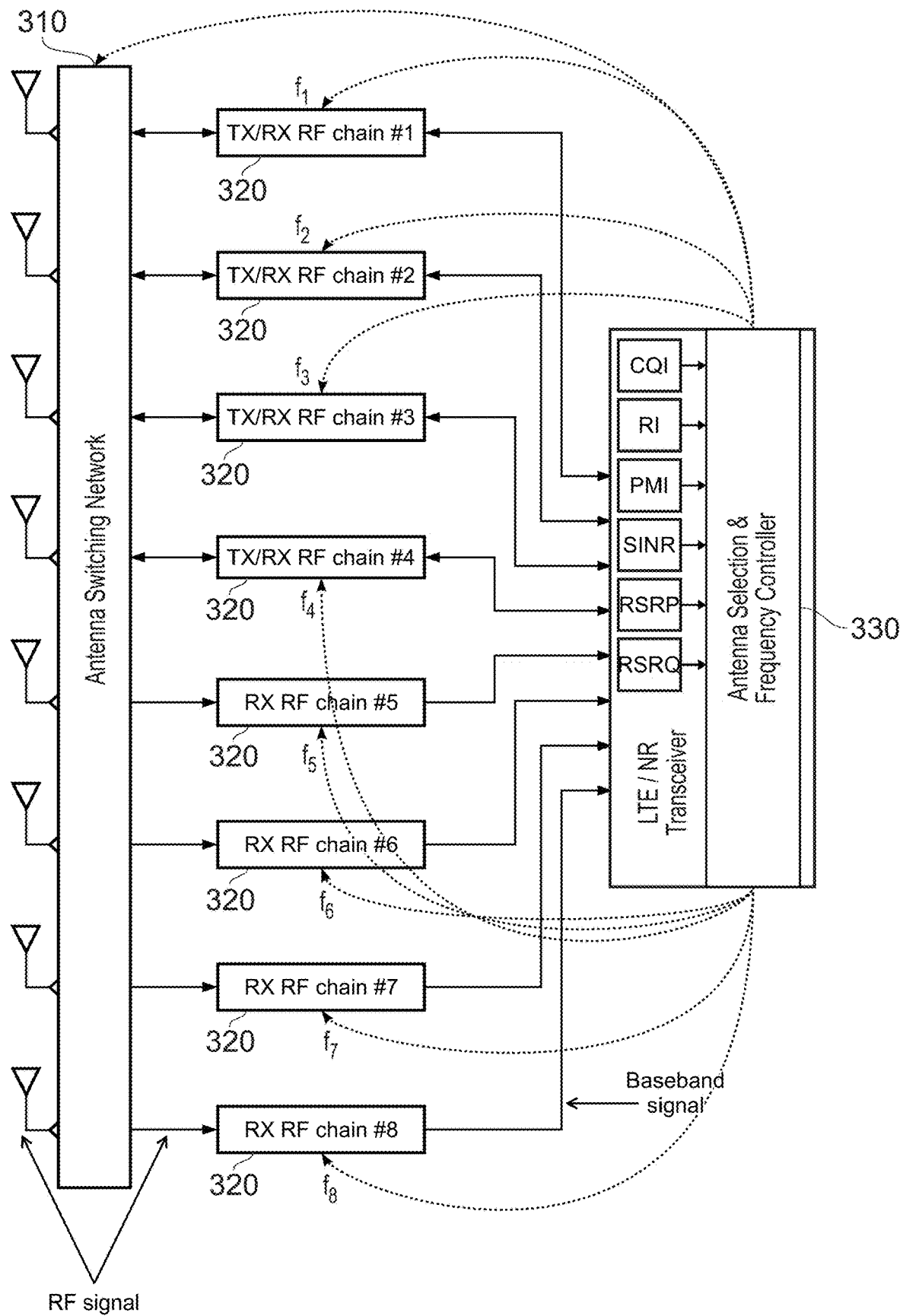
FIG. 4 illustrates an antenna selection and frequency controller component that can be used to configure utilisation of the antenna elements and RF processing circuits associated with the third antenna system of FIG. 3, in accordance with one example arrangement.

FIG. 4 is a block diagram illustrating in more detail some of the backhaul functionality that may be provided within the combined access and backhaul unit 10 in accordance with an example implementation. For the purposes of the following discussion, we focus on the downlink (DL) direction, i.e. where the combined access and backhaul unit 10 (also referred to herein as the relay unit) receives signals from the DeNB, but the techniques described herein also apply to the uplink (UL) direction where signals are transmitted from the combined access and backhaul unit to the DeNB. The antenna switching network 310 directs the incoming Radio Frequency (RF) signals from the DeNB to one or more receiver (RX) chains 320. Each RX chain will incorporate RF stage circuit elements that process the received RF signals, baseband stage (i.e. digital signal processing stage) circuits for processing the received signals after they have been converted from RF signals into baseband signals, and analog to digital conversion circuits for creating digital signals representative of the received RF signals, for further processing within the combined access and backhaul unit.

The antenna selection and frequency controller 330 implements the machine learning unit 240 of FIG. 3 and configures the frequencies on each RX chain 320 having regards to the available options offered by the DeNB, e.g. number of component carriers (CCs) (also referred to herein as frequency channels) and bandwidths, and the capabilities of the relay transceiver, e.g. User Equipment (UE) Category. In addition, the antenna selection and frequency controller 330 is responsible for computing and assigning each antenna element to one or more RX chains. In one configuration, each antenna is mapped to one RX chain. In an alternative configuration, one antenna is mapped to two RX chains, each operating in a different frequency. Whilst in FIG. 4 it will be appreciated that there are eight receive chains 230, when considering the transmit (uplink) direction only four transmit chains are provided in the implementation illustrated, and hence there are less configuration options for uplink communication.

However, as discussed earlier, when considering the transmit path communications, the supported configurations may include one or more configurations that allow transmit diversity schemes to be employed. In particular, the plurality of configurations may include at least one given configuration that identifies, for an uplink communication, multiple RF processing circuits that are allocated the same frequency channel, and are to be used for transmission of RF signals. In one example implementation the given configuration may couple each of the multiple RF processing circuits to different antenna elements. This can allow the earlier-mentioned Cyclic Delay Diversity (CDD) scheme to be used with the aim of mitigating inter-symbol interference by delaying the signals on different antenna elements. CDD can be a particularly beneficial technique to use when the signal is transmitted on different antenna elements having the same antenna polarisation.

The configuration options can include one or more that allow such CDD techniques to be used and one or more that do not use such a diversity scheme. For example, if one considers a case where there are two RF processing circuits that can be used for transmitting RF signals, and four possible antenna elements, two polarised one way (for example +45 degrees) and two polarised another way (say −45 degrees), then both CDD and non-CDD configurations can be supported, and the reinforcement learning techniques described herein can be used to determine which configuration is most appropriate at any point in time. In the above example case, CDD could be supported by allocating the two RF processing circuits the same frequency channel and allocating them to the two antenna elements that have the same polarisation. Conversely, a non-CDD configuration could be provided by connecting the two RF processing circuits to different antenna elements having different polarisations (e.g. one at +45 degrees and one at −45 degrees), either with or without the RF processing circuits using the same frequency channel.

Returning to the discussion of FIG. 4, the antenna selection and frequency controller 330 takes as input one or more components of the Uplink Control Information (UCI). The UCI is sent to the DeNB to indicate the quality of the DL link. It includes:
Channel State Information (CSI), comprising one or more of the following:
  Channel Quality Indicators (CQI)
  Rank Indicators (RI)
  Precoding Matrix Indicators (PMI)
  Precoding Type Indicators (PTI)
Scheduling Requests (SR)
HARQ Acknowledgements
A summary description of the various feedback components are given below:
HARQ: Hybrid Automatic Repeat Request (HARQ) ACK/NACKs are used to acknowledge the reception and decoding of DL packets.

SR: provides an indication of the amount of data that the relay has in its TX buffer.

CSI: the CSI feedback depends upon the DL transmission mode being used. The wideband channel reporting is preferred since the quality of the complete channel bandwidth of a CC is reported. Alternatively, sub-band CSI reporting may also be used; albeit at the expense of higher granularity in the search space.

PMI: in closed loop Single User (SU-) or Multi User (MU-) MIMO, the relay indicates the preferred TX weights at the DeNB that will maximize the DL Signal to Noise Ratio (SNR).

PTI: is a further enhancement to matrix precoding, applicable to slow and fast fading environments.

RI: reports the preferred number of layers (parallel spatial data streams) to be used in open loop or closed loop spatial multiplexing MIMO transmission.

CQI: reports the quality of the DL channels. It is an indication of the channel capacity taking into account the signal strength from the DeNB and the level of noise and interference detected by the relay. Example CQI values are shown in Table 1 and Table 2 below:

TABLE 1

4-bit CQI Table.

| CQI index | modulation | code rate × 1024 | efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

TABLE 2

4-bit CQI Table 2.

| CQI index | modulation | code rate × 1024 | efficiency |
| --- | --- | --- | --- |
| 0 | | out of range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 490 | 1.9141 |
| 6 | 16 QAM | 616 | 2.4063 |
| 7 | 64 QAM | 466 | 2.7305 |
| 8 | 64 QAM | 567 | 3.3223 |
| 9 | 64 QAM | 666 | 3.9023 |
| 10 | 64 QAM | 772 | 4.5234 |
| 11 | 64 QAM | 873 | 5.1152 |
| 12 | 256 QAM | 711 | 5.5547 |
| 13 | 256 QAM | 797 | 6.2266 |
| 14 | 256 QAM | 885 | 6.9141 |
| 15 | 256 QAM | 948 | 7.4063 |

The above tables 1 and 2 correspond to tables 7.2.3-1 and 7.2.3-2 from "3GPP TS 36.213 V15.2.0 (2018-06), 3rd Generation Partnership Project; Technical Specification Group Radio Access Network; Evolved Universal Terrestrial Radio Access (E-UTRA); Physical layer procedures (Release 15)".

In addition to the UCI, the antenna selection and frequency controller 330 may also utilise signal strength/quality indicators such as the Reference Signal Received Power (RSRP) and the Reference Signal Received Quality (RSRQ).

RSRP is a measure of the received power level from the DeNB, computed by taking the average power received from a single cell specific Reference Signal Resource Element. A resource element is the smallest discrete quantity of the frame, occupying 1 subcarrier and 1 symbol, containing a complex values symbol representing a modulated data or a pilot (reference signal). RSRP is measured in dBm and reported in one dB steps. The reported values are integers given in Table 3.

TABLE 3

RSRP measurement report mapping

| Reported value | Measured quantity value | Unit |
|---|---|---|
| RSRP_−17 | RSRP < −156 | dBm |
| RSRP_−16 | −156 < RSRP < −155 | dBm |
| ... | ... | ... |
| RSRP_−03 | −143 < RSRP < −142 | dBm |
| RSRP_−02 | −142 < RSRP < −141 | dBm |
| RSRP_−01 | −141 < RSRP < −140 | dBm |
| RSRP_00 | RSRP < −140 | dBm |
| RSRP_01 | −140 < RSRP < −139 | dBm |
| RSRP_02 | −139 < RSRP < −138 | dBm |
| ... | ... | ... |
| RSRP_95 | −46 < RSRP < −45 | dBm |
| RSRP_96 | −45 < RSRP < −44 | dBm |
| RSRP_97 | −44 RSRP | dBm |

Table 3 corresponds to table 9.1.4-1 from "3GPP TS 36.133 V15.4.0 (2018-09), 3rd Generation Partnership Project; Technical Specification Group Radio Access Network; Evolved Universal Terrestrial Radio Access (E-UTRA); Requirements for support of radio resource management (Release 15)".

RSRQ is a measure of the received signal quality, computed by taking the ratio of RSRP over the average received signal power, which includes the desired signal, interference and noise). RSRQ is measured in dBm and reported in half dB steps. The reported values are integers given in Table 4.

TABLE 4

RSRQ measurement report mapping

| Reported value | Measured quantity value | Unit |
|---|---|---|
| RSRQ_−30 | RSRQ < −34 | dB |
| RSRQ_−29 | −34 ≤ RSRQ < −33.5 | dB |
| ... | ... | ... |
| RSRQ_−02 | −20.5 ≤ RSRQ < −20 | dB |
| RSRQ_−01 | −20 ≤ RSRQ < −19.5 | dB |
| RSRQ_00 | RSRQ < −19.5 | dB |
| RSRQ_01 | −19.5 ≤ RSRQ < −19 | dB |
| RSRQ_02 | −19 ≤ RSRQ < −18.5 | dB |
| ... | ... | ... |
| RSRQ_32 | −4 ≤ RSRQ < −3.5 | dB |
| RSRQ_33 | −3.5 ≤ RSRQ < −3 | dB |
| RSRQ_34 | −3 ≤ RSRQ | dB |
| RSRQ_35 | −3 ≤ RSRQ < −2.5 | dB |
| RSRQ_36 | −2.5 ≤ RSRQ < −2 | dB |
| ... | ... | ... |
| RSRQ_45 | 2 ≤ RSRQ < 2.5 | dB |
| RSRQ_46 | 2.5 ≤ RSRQ | dB |

Table 4 corresponds to table 9.1.7-1 from "3GPP TS 36.133 V15.4.0 (2018-09), 3rd Generation Partnership Project; Technical Specification Group Radio Access Network; Evolved Universal Terrestrial Radio Access (E-UTRA); Requirements for support of radio resource management (Release 15)".

In addition to UCI, RSRP and/or RSRQ information, the antenna selection and frequency controller 330 may also receive CINR information, and based on one or more of these received inputs can determine a current link state of the backhaul communication link. The Carrier to Interference plus Noise Ratio (CINR) is a relative measure to determine the wanted signal strength relative to the signal strength of co-channel interfering signals and the thermal noise generated by the receiver electronics. The reported CINR measurement is defined from −23 dB to 40 dB with 0.5 dB resolution. The reported values are integers given in Table 5.

TABLE 5

CINR measurement report mapping

| Reported value | Measured quantity value | Unit |
|---|---|---|
| CINR_000 | CINR < −23 | dB |
| CINR_001 | −23 ≤ CINR < −33.5 | dB |
| ... | ... | ... |
| CINR_126 | 39.5 ≤ CINR < 40 | dB |
| CINR_127 | CINR | dB |

Table 5 corresponds to table 9.1.17-1 from "3GPP TS 36.133 V15.4.0 (2018-09), 3rd Generation Partnership Project; Technical Specification Group Radio Access Network; Evolved Universal Terrestrial Radio Access (E-UTRA); Physical layer procedures (Release 15)".

In an example implementation the third antenna system 225, at any time instant, may take one of eight possible antenna configurations. All valid antenna configurations for one example implementation are summarised in Table 6. In configuration index #1, all eight relay antennae are used by the Primary Component Carrier (PCC). The Secondary Component Carrier (SCC) is not used. In the second configuration the PCC and the SCC use antenna 1, 2, 3 and 4. All other antennae are ignored. As another example, moving onto configuration 8, we see the side looking relay antennae (see FIG. 3) are used by the PCC. The SCC uses the forward looking relay antennae 3, 4, 5 and 6.

TABLE 6

DL Antenna and Component Carrier Configurations.

| Configuration Index | Antennae allocated on CC#1 (PCC) | Antennae allocated to CC#2 (SCC) |
|---|---|---|
| 1 | 1, 2, 3, 4, 5, 6, 7, 8 | N/A |
| 2 | 1, 2, 3, 4 | 1, 2, 3, 4 |
| 3 | 3, 4, 5, 6 | 3, 4, 5, 6 |
| 4 | 5, 6, 7, 8 | 5, 6, 7, 8 |
| 5 | 1, 2, 7, 8 | 1, 2, 7, 8 |
| 6 | 1, 2, 3, 4 | 5, 6, 7, 8 |
| 7 | 1, 2, 5, 6 | 3, 4, 7, 8 |
| 8 | 1, 2, 7, 8 | 3, 4, 5, 6 |

Figure 5A:
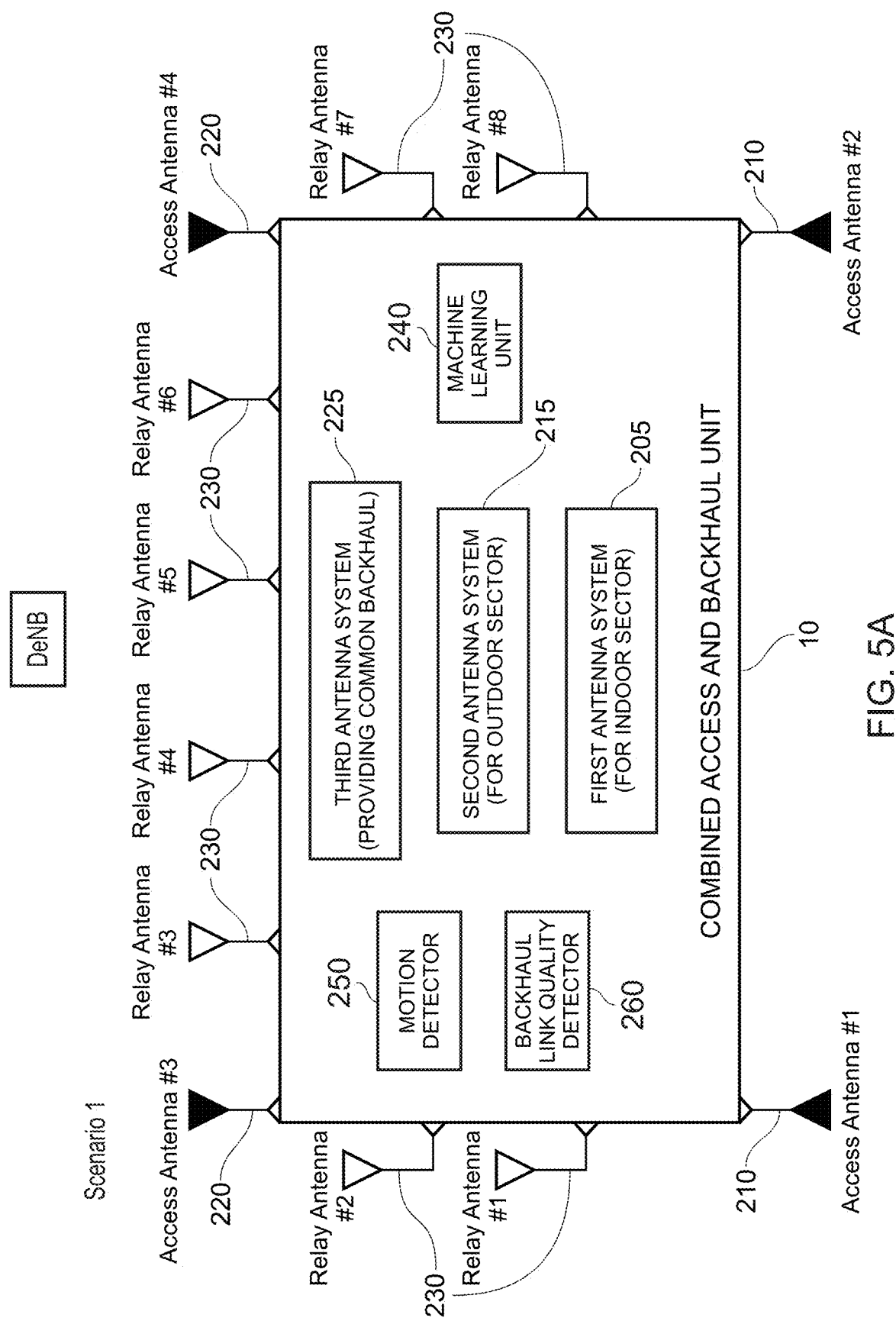
FIGS. 5A and 5B illustrate two example scenarios with respect to the directional placement of the combined access and backhaul unit relative to a base station of the network, in accordance with one example arrangement.
Figure 5B:
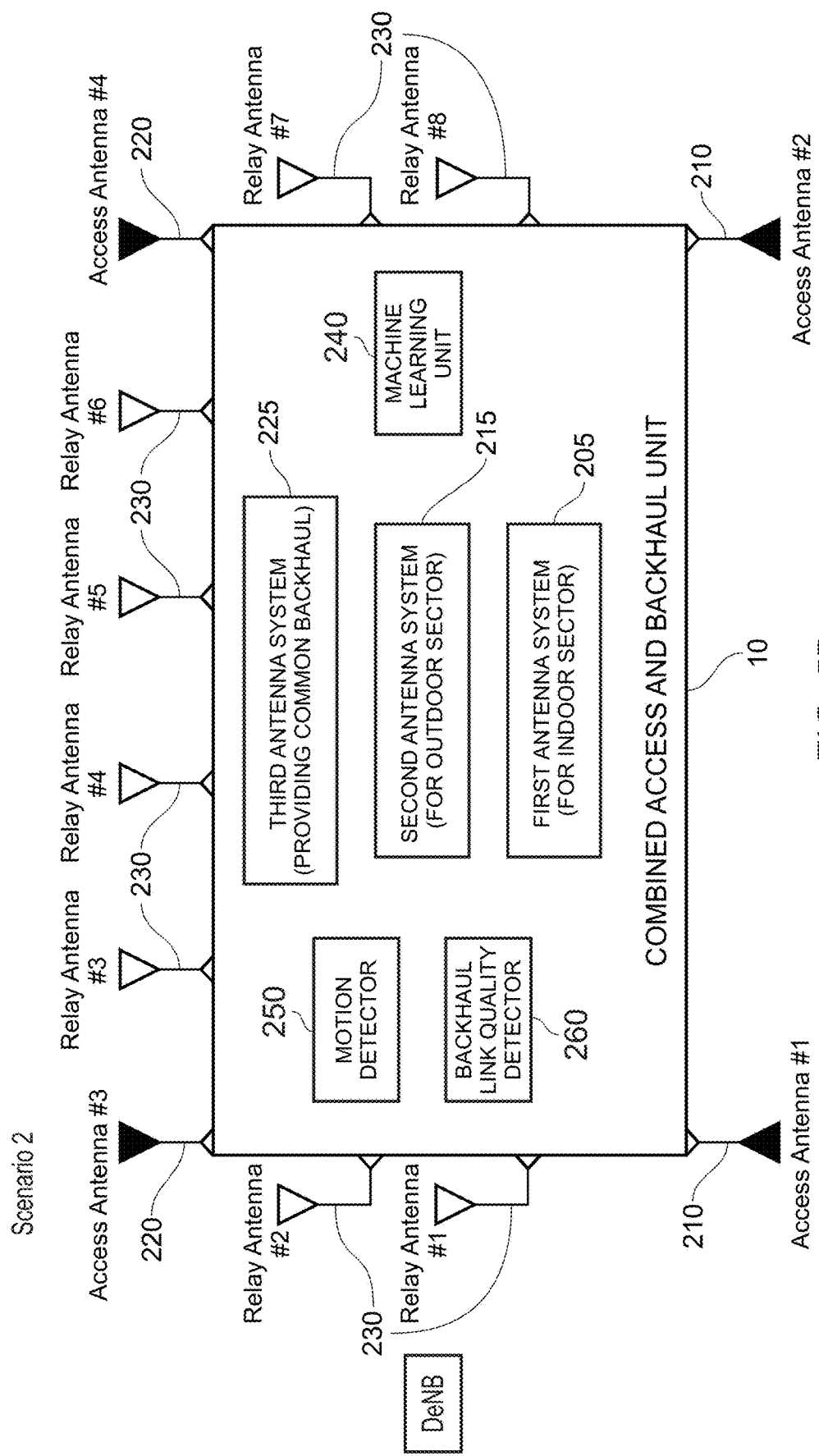

In addition to the CC/antenna configurations, let us consider two example setup scenarios for the combined access and backhaul unit 10 relative to a DeNB:
1) DeNB is located in the direction of the forward looking relay antennae, as illustrated in FIG. 5A, and also referred to herein as scenario 1 (or setup 1); and 2) DeNB is located to one side of the unit, as illustrated in FIG. 5B, and also referred to herein as scenario 2 (or setup 2).

It will be apparent to one of ordinary skill in the art that other setup configurations are possible once the unit is deployed in the field. The two mentioned here are for illustration purposes to demonstrate the performance of the proposed method.

Depending on the orientation of the unit 10 and the scattering environment, the signal strength from the DeNB will be received at the relay antennae at different signal levels. Example relative RSRP signal levels at the relay antennas for the two setup scenarios are given by Table 7 below:

TABLE 7

Relative RSRP levels for two Setup Scenarios.

| Relay Antenna Number | Relative Gain For Setup #1 (dB) | Relative Gain For Setup #2 (dB) |
|---|---|---|
| 1 | −10.00 | 0.00 |
| 2 | −10.00 | 0.00 |
| 3 | 0.00 | −10.00 |
| 4 | 0.00 | −10.00 |
| 5 | 0.00 | −10.00 |
| 6 | 0.00 | −10.00 |
| 7 | −10.00 | −20.00 |
| 8 | −10.00 | −20.00 |

Figure 6A:
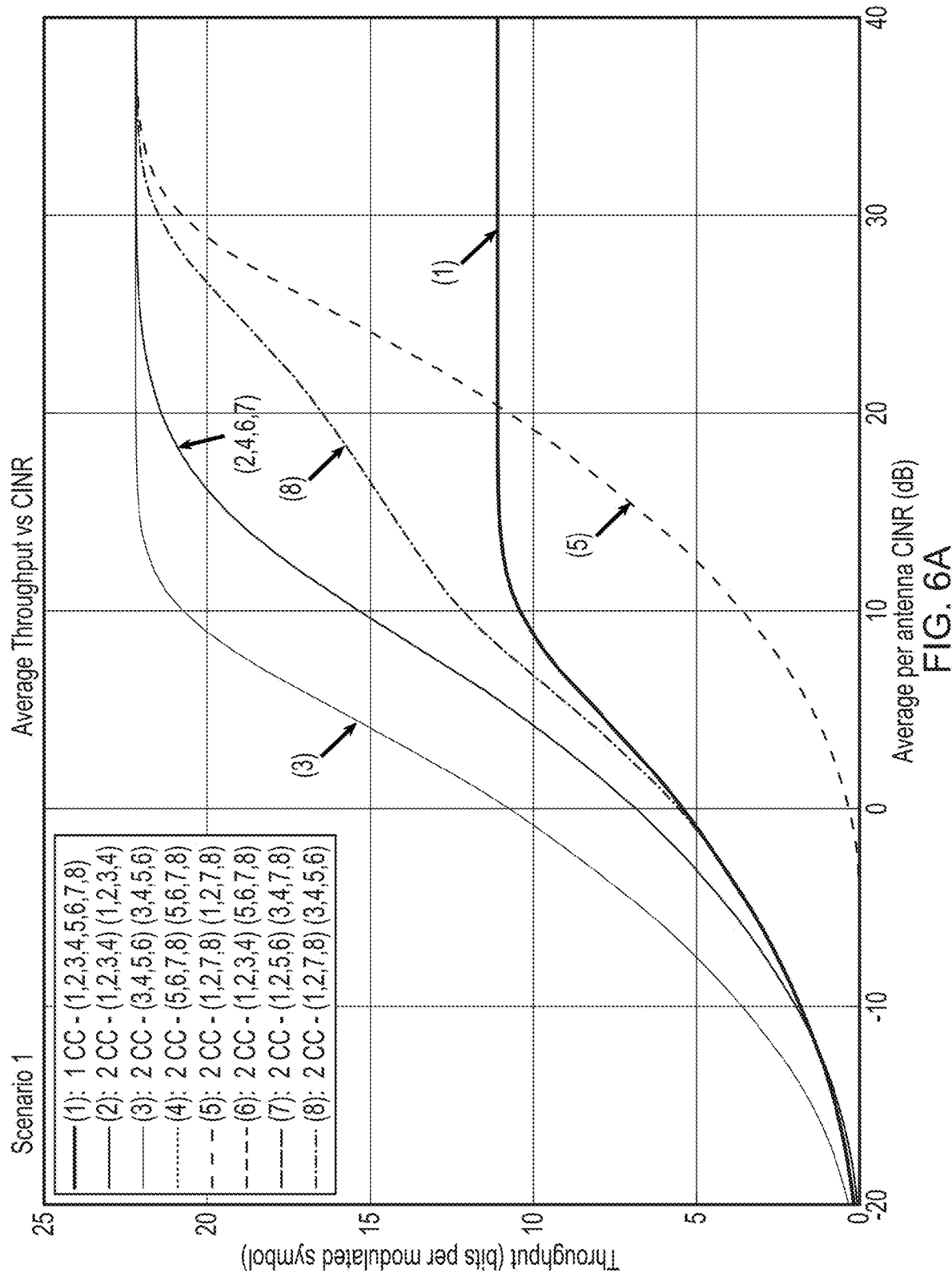
FIGS. 6A and 6B illustrate average throughput versus signal to noise ratio for each of a number of different configurations of the antenna elements and RF processing circuits for scenario 1 and scenario 2, respectively.
Figure 6B:
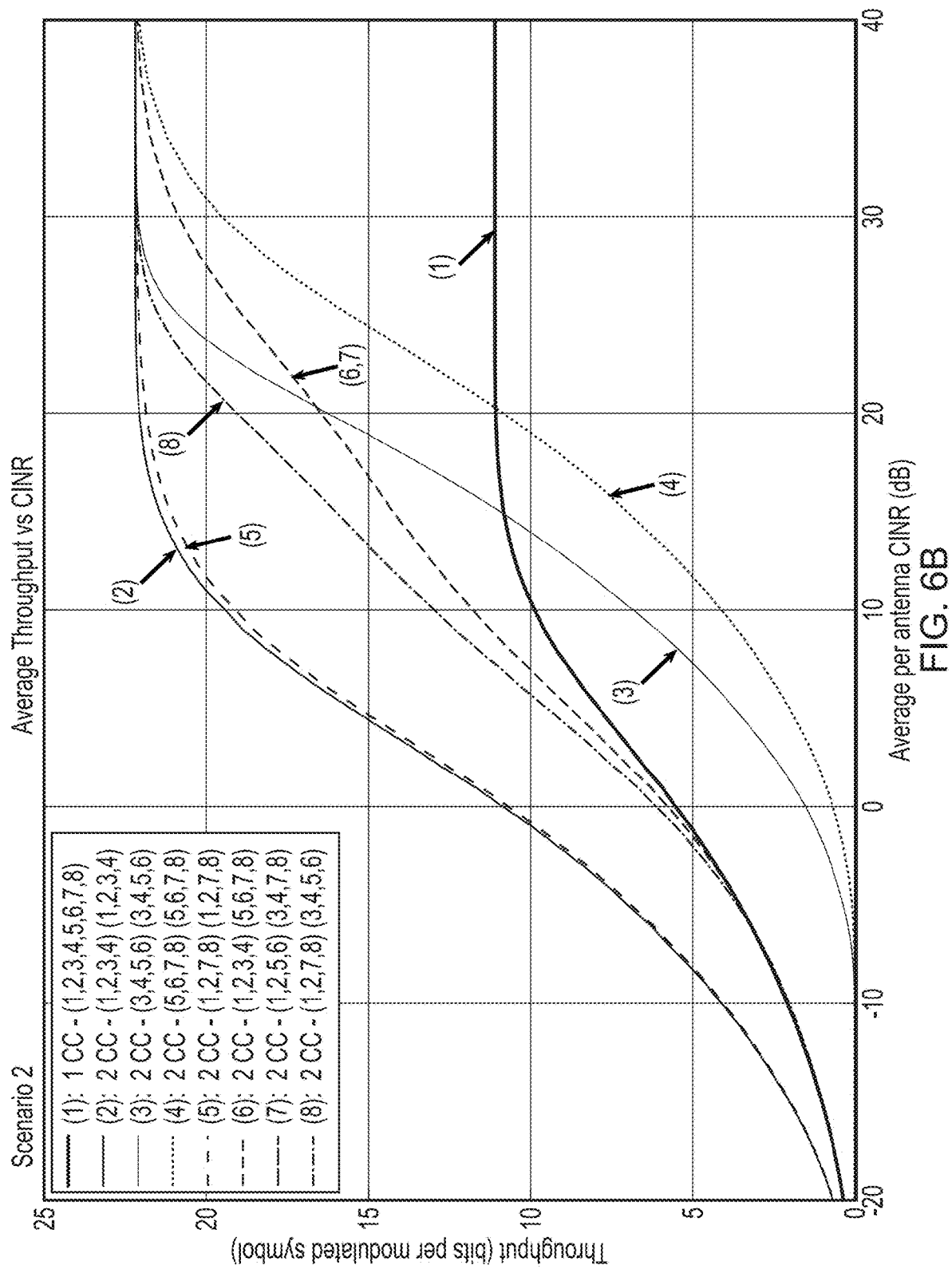

Assuming the baseband unit can process up to 2 MIMO layers per CC, then the spectral efficiency as a function of the average per antenna CINR for the various configurations are illustrated in FIGS. 6A and 6B for the two hypothetical setups. Efficiency is measured as the number of bits per modulated symbol.

As shown by these figures, each configuration performs differently in terms of the throughput observed, and while the throughput generally goes up with increased CINR, the increase is not necessarily uniform, and certain configurations perform better than others at different CINR levels. Considering scenario 1 illustrated in FIG. 5A, then it will be seen from FIG. 6A that configuration 3 performs best, this being where all of the forward facing antenna elements 3 to 6 are used, for both frequency channels. Configuration 5 performs quite poorly, as only the side facing antennas are used, for both frequency channels. Further, it is noted that configuration 1 plateaus out with regards to throughput, primarily due to the fact that only a single frequency channel is used. Using 2 frequency channels, as illustrated in FIGS. 6A and 6B, configurations 2 to 8 for high CINR can double the maximum throughput relative to configuration 1 that uses a single frequency channel.

Similarly, when considering scenario 2 illustrated in FIG. 5B, then as shown in FIG. 6B configurations 2 and 5 perform best, with configuration 2 performing slightly better in the CINR range from about 5 to 25 dBs. Both of these configurations use the antenna elements 1 and 2 for both frequency channels, and hence good quality signals are received on both frequency channels. Conversely, configuration 4 performs badly, since antenna elements 5, 6, 7 and 8 are used on both frequency channels, and as is apparent from FIG. 5B those will receive poor quality signals from the DeNB. Again, it is noted that configuration 1 plateaus out with regards to throughput.

In accordance with the techniques described herein, the antenna selection and frequency controller 330 is arranged to perform a particular form of machine learning in order to decide at any particular point in time which of the above discussed configurations to use, taking into account the current link state. The particular form of machine learning is adapted in a manner that will be discussed in detail herein to accelerate both the initial learning process, and the speed with which configurations can be adapted to take account of changing network conditions.

Machine learning is the art of getting computers to carry out tasks without being explicitly programmed. Machine learning tasks are broadly divided into two categories, namely supervised and unsupervised learning. Supervised learning is learning from a training set where data are labelled and provided by an external agent. The aim is to extrapolate the knowledge attained, to classify for example objects not present in the original training data set. Unsupervised learning, on the other hand, does not rely on labels. Instead, in unsupervised learning the computer program is left on its own devices to find and classify underlying structures in its input. Yet, according to Sutton in "Reinforcement Learning, An Introduction, by Richard S. Sutton and Andrew G. Barto. Second Edition, MIT Press, Cambridge, Mass., London, England, 2018", a third paradigm of machine learning exists that fits alongside supervised and unsupervised machine learn: reinforcement learning.

In reinforcement learning, a computer agent interacts with the environment by taking a sequence of actions. Each action may change the state of the environment. The agent after each action observes the new state and receives a reward. The aim of the agent is to maximise the current and future rewards.

More formally, let S denote the set of all states in the environment. Let $s_k \in S$ denote the state of the environment at time index k. The set of actions is denoted by A. The agent at time index k applies action $a_k$ and (1) forces the environment to move to a new state $s_{k+1}$, (2) receives a reward $r_{k+1}$ when visiting the new state. The aim is to maximise the value function $v_\pi(s_k)$, which is the estimate of the future discounted rewards starting from state $s_k$: $v_\pi(s_k) = E_\pi\{r_{k+1} + \gamma r_{k+2} + \gamma^2 r_{k+2} + \gamma^3 r_{k+2} + \ldots | s_k\}$. $\gamma$ is the discount factor; the smaller the gamma the more we weight the immediate future rewards. Preferably, we seek to maximise the action-value function $q_\pi(s_k, a_k) = E_\pi\{r_{(k+1)} + \pi r_{(k+2)} + \gamma^2 r_{(k+3)} + \gamma^3 r_{(k+4)} + \ldots | s_k, a_k\}$, which is the expected discounted future rewards taking action $a_k$ from state $s_k$ at time index k, following policy $\pi$. A policy is a set of instructions that an agent uses to pick its actions. In other words, $\pi$ is a function that maps a state to an action. $\pi$ can be deterministic:

$$a_k = \pi(s_k),$$

or stochastic:

$$\pi(a_k | s_k) = Pr\{a_k | s_k\}$$

Assuming the states are Markov, i.e.

$$Pr\{s_{k+1} | s_k, a_k\} = Pr\{s_{k+1} | s_0, a_0, s_1, a_1, s_2, a_2, \ldots, s_k, a_k\}$$

which states that the future is independent of the past given the present (similarly $E\{r_{k+1} | s_k, a_k\} = E\{r_{k+1} | s_0, a_0, s_1, a_1, s_2, a_2, \ldots, s_k, a_k\}$, then the optimal policy that maximises the action-value function over all policies is given by Bellman's optimality equation (as discussed in "Reinforcement Learning, An Introduction, by Richard S. Sutton and Andrew G. Barto. Second Edition, MIT Press, Cambridge, Mass., London, England, 2018", and "Dynamic Programming and Optimal Control, by Dimitri P. Bertsekas, Athena Scientific, Belmont, Mass., 1995"):

$$Q(s_k, a_k) = E\{r_{k+1} + \gamma \max_{a \in A} Q(s_{k+1}, a) \mid s_k, a_k\} \quad \text{Eq (1)}$$

The optimal action $a_k$ at state $s_k$ is given by $$a_k = \max_{a \in A} Q(s_k, a).$$

The problem with the methodology so far is that we rely on a model for the state transitions and the reward processes. To overcome this limitation, we employ Q-learning, a model-free, off-policy optimisation methodology for learning the action-values $(s_k, a_k)$. An off-policy learning, the agent learns about the optimal policy while following an exploratory policy. Thus, Q-learning employs two policies; a target policy and a behaviour policy. As stated in "Reinforcement Learning, An Introduction, by Richard S. Sutton and Andrew G. Barto. Second Edition, MIT Press, Cambridge, Mass., London, England, 2018" " . . . use two policies, one that is learned about and that becomes the optimal policy, and one that is more exploratory and is used to generate behavior. The policy being learned about is called the target policy, and the policy used to generate behavior is called the behavior policy". An example behaviour policy is the E-greedy policy, where the agent picks a random action with probability E. The target policy is greedy with respect to $Q(s_k, a_k)$. To summarise, the target policy is given by $$a_k = \pi_t(s_k) = \arg \max_a Q(s_k, a) \quad \text{Eq (2)}$$

and the behaviour policy is given by $$a_k = \pi_b(a \mid s_k) = \begin{cases} \arg \max_a Q(s_k, a), & \text{with probability } 1 - \epsilon \\ \text{any random action}, & \text{with probability } \epsilon \end{cases} \quad \text{Eq (3)}$$

The update formula for Q-learning is derived from Bellman's optimality equation by employing iteration and replacing the expectation operator by sampling, as follows:

$$Q(s_k, a_k) = (1 - \alpha)Q(s_k, a_k) + \alpha\{r_{k+1} + \gamma \max_a Q(s_{k+1}, a)\} \quad \text{Eq (4)}$$

Where $\alpha$ is the learning rate, taking a value between 0 and 1. For example, setting $\alpha$ to 1 only the most recent information would be used. Taking it to the other extreme, i.e. $\alpha=0$, all future measurements will be ignored and thus nothing new will be learnt. Furthermore, at time instant k+1, the environment arrives at state $s_{k+1}$ after the agent applies control $a_k$ using the behaviour policy $\pi_b(a|s_k)$ of Eq. (3). The Q-learning algorithm set out in "Reinforcement Learning, An Introduction, by Richard S. Sutton and Andrew G. Barto. Second Edition, MIT Press, Cambridge, Mass., London, England, 2018" is given below:

---

Q-learning (off-policy TD control) for estimating $\pi \approx \pi$ *

Algorithm parameters: step size $\alpha \in (0,1)$, small $\epsilon > 0$
Initialize $Q(s,\alpha)$, for all $s \in \mathcal{S}^+$, $\alpha \in \mathcal{A}(s)$, arbitrarily except that Q (terminal,.) = 0

---

Q-learning (off-policy TD control) for estimating $\pi \approx \pi$ *

Loop for each episode:
  Initialize $\mathcal{S}$
  Loop for each step of episode:
    Choose $\mathcal{A}$ from $\mathcal{S}$ using policy derived from Q (e.g., $\epsilon$-greedy)
    Take action $\mathcal{A}$, observe R, $\mathcal{S}'$
    $Q(\mathcal{S}, \mathcal{A}) \leftarrow Q(\mathcal{S}, \mathcal{A}) + \alpha [R + \gamma \max_\alpha Q(\mathcal{S}', \alpha) - Q(\mathcal{S}, \mathcal{A})]$
    $\mathcal{S} \leftarrow \mathcal{S}'$
  until $\mathcal{S}$ is terminal

---

Figure 7:
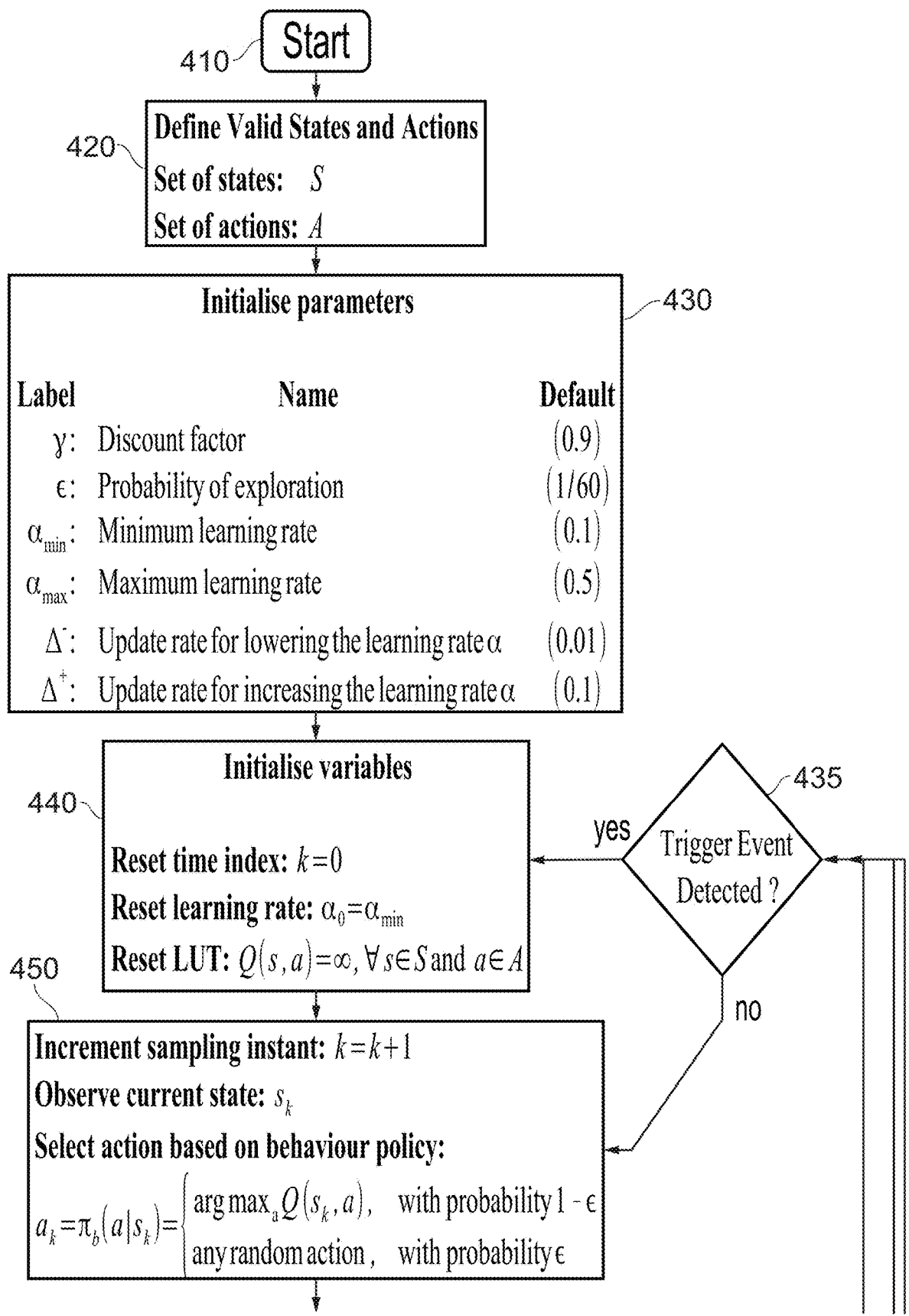
FIG. 7 illustrates a reinforcement learning process employed by the machine learning unit of FIG. 3 in accordance with one example arrangement in order to cause the selected configuration of the antenna elements and RF processing circuits to be dynamically altered during live use of the combined access and backhaul unit, in order to seek to optimise utilisation of the communication link between the third antenna system and the base station.
Figure 7:
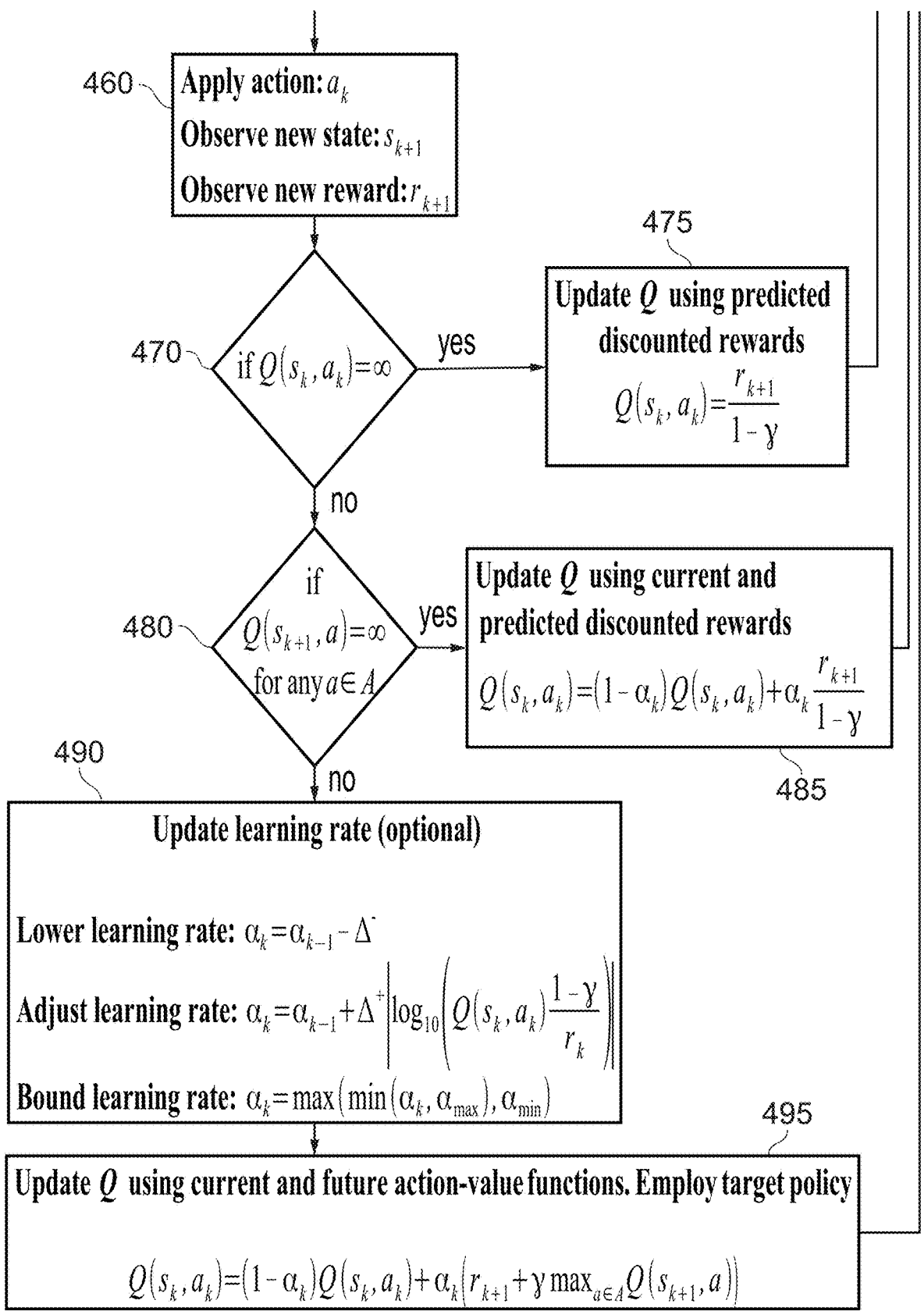

In accordance with the techniques described herein a modified Q-learning algorithm is performed that incorporates an adaptive learning regime and a reset mechanism, as shown in FIG. 7. The process begins at step 410, and then at step 420 the valid set of states and valid set of actions are defined. The set of actions corresponds to the set of available configurations, and hence in the particular example the actions can take any of the eight configurations discussed earlier in Table 6 when considering the downlink configuration example. Note that not all actions may be valid or desirable options for any given state. For example, if the resent rewards far exceed the maximum anticipated reward of a state most likely to be visited by applying an action a, then it would be wise to avoid applying the action a.

The set of states includes each possible link state that may be observed based on the measurement information discussed earlier (the UCI, RSRP, RSRQ, CINR information).

At step 420, the reward structure may also be defined, identifying for example whether throughput (also referred to as spectral efficiency) is seeking to be maximised, or whether some other performance metric is seeking to be maximised.

At step 430, the parameters of the machine learning algorithm are set, and these particular parameters will be referred to later with reference to the remaining steps of FIG. 7. At step 440 certain variables are initialised, namely: the time index is set/reset to 0, the learning rate is initialised and the lookup table Q is reset for all entries. The preferred option for the initial learning rate is $\pi_{max}$. We may instead choose to set the initial learning rate to $\pi_{max}$ to place larger weight on the initial measurements. We set all the entries of the Q LUT to infinity. By doing so we encourage exploration during the initial phase of the algorithm as will become apparent further on during the description of the algorithm. Alternatively, the entries of the Q LUT may be initialised to 0 and with the assistance of a large learning rate we could expect after a good number of iteration Q to converge. In addition, for any invalid state-action pair entries we set the corresponding Q value to nil.

Figure 8:
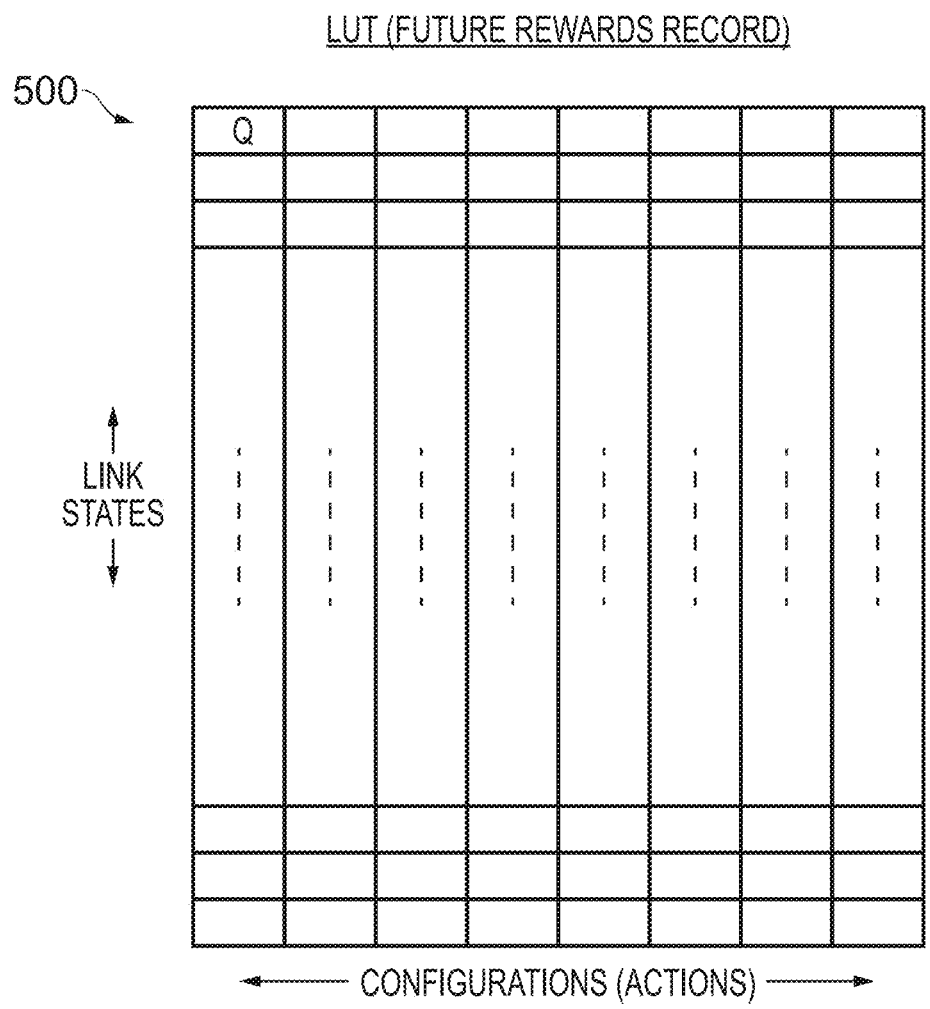
FIG. 8 schematically illustrates a lookup table that may be used when performing the process of FIG. 7 in accordance with one example arrangement.

FIG. 8 schematically illustrates the form of the lookup table. As shown, the lookup table 500 (which may also be referred to herein as a future rewards record) has a plurality of entries, and each entry is arranged to maintain, for an associated combination of link state and configuration, an estimated future rewards indication (Q) that is determined using the earlier discussed discounted rewards mechanism.

At step 450, the sampling time is incremented, and a current link state is observed. Based on the earlier discussed behaviour policy, an action is then selected. This will involve referring to the lookup table whilst in an exploitation phase, but otherwise choosing a random action when in an exploration phase, the split between the exploitation and exploration phases being determined by the "probability of exploration" parameter indicated in step 430.

At step 460, the selected action is applied, and a new link state is then observed. In addition, the new reward resulting from the selected action (i.e. the selected configuration) is also observed.

At step 470, if the entry of the Q LUT entry for the current state action pair (i.e. the entry for the current link state and chosen action) is set to infinity, or viewed in another way the state action pair is visited for the first time, then we move to step 475. In step 475 we initialise the Q entry based on the received measurement assuming all future rewards are the same, by computing a predicted estimated future rewards indication.

That is, $$Q(s_k, a_k) \cong E\{r_{k+1} + \gamma r_{k+2} + \gamma^2 r_{k+3} + \gamma^3 r_{k+4} + \ldots\} \cong$$

$$r_{k+1} + \gamma r_{k+1} + \gamma^2 r_{k+1} + \gamma^3 r_{k+1} + \ldots = r_k \sum_{0}^{\infty} \gamma^n = \frac{r_k}{1-\gamma}.$$

The last result follows since the infinite sum is a geometric series with common ratio $\gamma$. It has been found that through such a process, the Q LUT can be populated with reliable information much more quickly, hence accelerating the learning process.

If at step 470 it is determined that the Q LUT entry has already been encountered before, then the process proceeds to step 480, where it is determined if any of the actions for the next state have not been visited (i.e. if any of the entries in the QLUT associated with the link state $s_{k+1}$ are set to infinity). If that is the case, then the process moves to step 485 where the updated estimated future rewards indication to be stored in the entry for the current link state and chosen action is computed by weighted averaging the current value and the predicted estimated future rewards indication. It has been found that this process can also more quickly lead to reliable information being stored within the future rewards record, and hence can accelerate the learning process. As shown in box 485, the weighting is performed using the current learning rate.

Assuming either step 475 or 485 is performed, then the process returns to step 450 via the trigger event detection step 435. Trigger events will be discussed later, but in summary will cause the learning process to be re-initialised by returning to step 440. However, in the absence of the trigger event, the process proceeds to step 450.

At step 490, the learning rate is adapted. First we bias the learning rate in the direction of the minimum value set in step 430. Then we compare the current value of the state-action pair $Q(s_k, a_k)$ against the future predicted returns $r_k/(1-\gamma)$. When the ratio is close to unity, then the logarithm returns a value close to zero and thus the learning rate is not increased. If on the other hand, the ratio significantly deviates from unity (for example taking a value of 5 or 1/5), then the absolute value of the logarithm will be positive forcing the learning rate to increase. Finally, the last operation of step 490 is to bound the learning rate between the maximum and minimum values set in step 430. It has been found that the adaptive learning rate mechanism illustrated in step 490 can significantly increase the speed of the learning process. Hence it will be seen that each of steps 475, 485 and 490 lead to acceleration of the learning process, enabling the antenna selection and frequency controller 330 to quickly lock onto the most appropriate configuration for the current network environment.

Following step 490, the process proceeds to step 495, where the standard update formula for Q-learning is applied. The process then returns to step 435.

Whilst the above-described mechanisms provide for a significantly accelerated learning process, thus improving efficiency in the utilisation of the communication link, situations can arise that can impact the learning process, and affect the applicability of the information maintained within the Q LUT. Accordingly, the learning process may be arranged to reinitialise the reinforcement learning process upon occurrence of a reset event as illustrated by step 435 of FIG. 7.

Due to the fact that the earlier described mechanisms lead to a very fast and efficient learning process, it has been found that there can be certain situations where it is better to reset the mechanism, rather than wait for the reinforcement learning process to adapt. In particular, given that when employing the techniques described herein the initial lead time following initialisation of the reinforcement learning process before reliable configuration information can be learnt is small, the impact of reinitialising the learning process is reduced, and hence it can be useful in some situations to reinitialise the reinforcement learning process.

As discussed earlier, step 435 checks whether a trigger event is detected, also referred to herein as a reset event. This can occur for a variety of reasons, for example: (i) movement of the apparatus beyond a determined threshold amount; (ii) one or more trigger events associated with an adverse effect on link quality; (iii) a periodic trigger event associated with elapse of a chosen time period. With regards to the first option, the motion detector 250 discussed earlier with reference to FIG. 3 can be used to detect motion of the combined access and backhaul unit 10 beyond a certain threshold. The motion detector could take a variety of forms, for example a GPS device, and/or an accelerometer device. Purely by way of illustrative example, if the combined access and backhaul unit were rotated by 90° on the windowsill, then it could move from a scenario similar to scenario 1 of FIG. 5A to a scenario similar to scenario 2 of FIG. 5B, which would have a significant effect on throughput of the backhaul link until the learning process has adapted to the change. In accordance with the techniques described herein, the trigger event occurs at that point, causing the learning process to reinitialise.

With regards to the second option discussed above, the backhaul link quality detector 260 can be used to detect certain adverse effects on the link quality, and in those instances cause the trigger event to be detected. Conditions which can be monitored by the backhaul link quality detector 260 and used as a trigger event are:
1. Initial attach, that is, when the backhaul unit 10 first establishes a wireless connection to the network utilising the third antenna system 225.
2. Forced scan, for example when human intervention causes the unit to reboot or to reinitialise.
3. Access Point Name (APN) detach. The backhaul unit 10 may utilise one or more APNs to allow data to flow from the unit to other network components. For example, one APN may be used to provide a control mechanism to drive the backhaul unit 10 remotely, and another APN to be setup to carry data from 205 and 215 to the network. Thus, if one of APNs is lost, this indicates a significant system failure.
4. RRC (Radio Resource Control) state change i.e. RRC Idle to RRC Connected, Reconfiguration, etc. The RRC protocol exists on Layer 3 of the LTE Protocol stack and it is responsible for handling the establishment, configuration, maintenance and release of Radio Bearers (RB). RBs are virtual channels of communication of user data and signalling.

5. The Medium Access Layer (MAC) and the Radio Link Control (RLC), both allocated on Layer 2 of the LTE stack, also provide valuable link quality metrics that can trigger a reset. For example, a high and prolonged level of HARQ (or ARQ) errors may indicate a significant change of the radio link.
6. Finally, significant deviations of Physical Layer (Layer 1) metrics, such as the ones already mentioned, i.e. CINR, RSRP and RSRQ, may also indicate a change on the wireless link quality.

If any of the above are observed, the earlier discussed trigger event can take place at step 435, in order to reinitialise the learning process. It should be noted that if any of the metrics mentioned above is included in the state space of the reinforcement learning algorithm, then they may not need to be considered in the triggering process, since changes of the state is captured in the Q LUT.

Figure 9A:
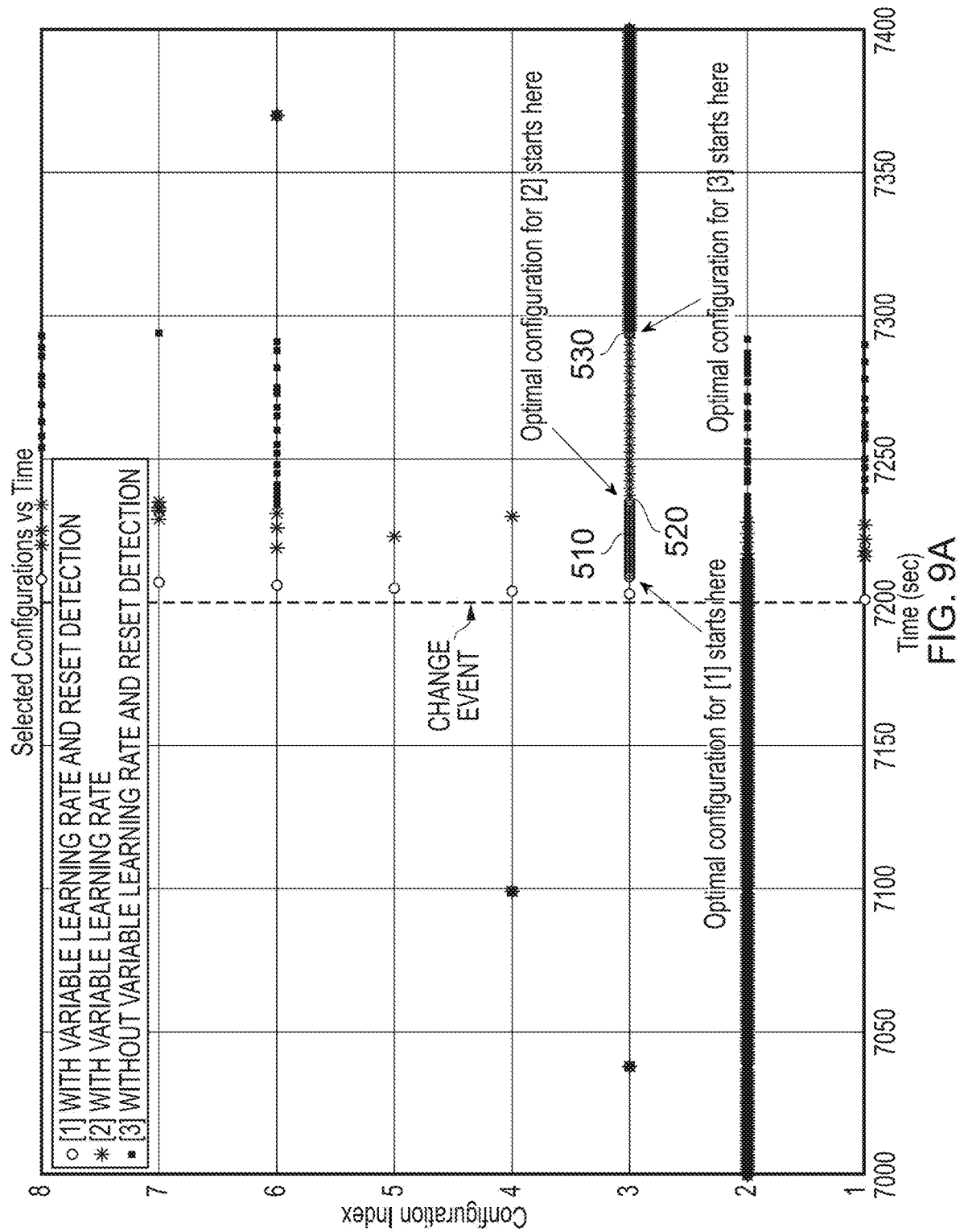
FIGS. 9A and 9B are graphs illustrating the accelerated learning that results from use of the technique described in FIG. 7, in accordance with one example arrangement.
Figure 9B:
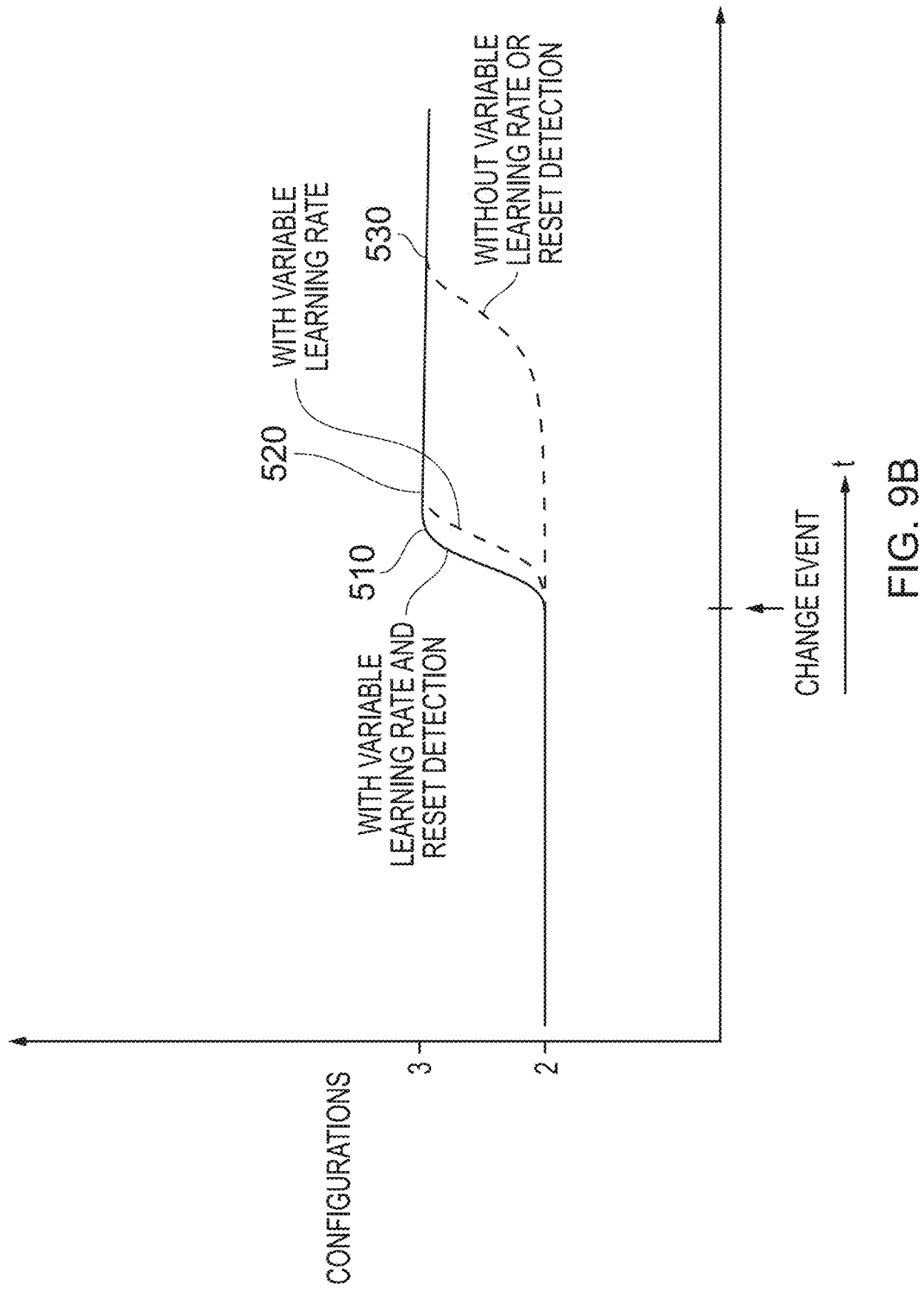

It has been found that the above described mechanisms provide a very efficient and effective technique for dynamically reconfiguring the antennas used for backhaul communication within the combined access and backhaul unit 10. As shown schematically in FIG. 9A, when introducing a significant change event, which results in this example in the optimal configuration changing from configuration 2 to configuration 3, it was found that with the accelerated learning mechanisms of steps 475, 485 and 490, and also using the reset detect detection trigger of step 435, the necessary relearning occurs very quickly, as indicated by the transition point 510. If the reset detection trigger is deactivated, but the mechanisms of steps 475, 485 and 490 are still retained, then as shown by the transition point 520 an accelerated learning is still achieved. The transition point 530 by contrast shows the time delay introduced when the above described mechanisms are not incorporated within the learning process. FIG. 9A shows the configurations used at each time point for the three example scenarios, and FIG. 9B is included to provide a simplified version of the transition information shown in FIG. 9A.

From the above discussions, it will be appreciated that the present technique provides an apparatus and method for providing enhanced network capacity and coverage in a wireless network.

Unquenchable demand for ever increasing data rates and proliferation of devices are key driving forces of fourth and fifth generation (4G/5G) wireless communication products and services. Densification of network topologies, utilisation of multiple frequency bandwidths and employment of multiple antennae at the wireless communication nodes are key enablers that address the challenge.

Due to physical layer processing limitations, signals from the antennae located in the periphery of a wireless communication device are allocated to specific/fixed frequency bands, down-converted to baseband, demodulated and decoded. Due to signal fading (shadow and/or fast fading), the signal level at any time instant across the antennae may differ significantly. In such scenarios, it may be advantageous to distribute the antennae with the highest signal quality equally across all frequency bands, rather than rely on random channel realisations. In other scenarios where the signal quality is very low it may be advantageous to allocate all antennae to a single channel and rely on maximum ratio combing to enhance the signal.

The present technique provides an apparatus and a method that can address such issues, by providing an autonomous continuous antenna to frequency configuration that maximises the system throughput by exploring different configurations while exploiting the experience attained by observing and operating in a live wireless communication environment.

In accordance with the techniques described herein, the third antenna system has an antenna assembly and processing units that are capable of employing a number of uplink (UL) and downlink (DL) configurations that continuously adapt to meet the ever-changing radio conditions and congestion in the network. The third antenna system may be configured to allocate an antenna element to a certain radio transceiver, and one or more radio transceivers are assigned to a certain Component Carrier (CC). Each CC is characterised by a centre frequency, a channel bandwidth and utilises Multiple Input Multiple Output (MIMO) processing to transmit and receive parallel data streams.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:
1. An apparatus comprising:
a plurality of antenna elements to support radio frequency (RF) communication over a communication link using a plurality of frequency channels;
a plurality of RF processing circuits for processing RF signals; and
configuration circuitry to apply a selected configuration from a plurality of different configurations, each configuration identifying which RF processing circuit each antenna element is coupled to, and which frequency channel is allocated to each RF processing circuit, wherein the plurality of configurations includes at least one given configuration that identifies, for an uplink communication, multiple RF processing circuits that are allocated the same frequency channel, and are to be used for transmission of RF signals,
the configuration circuitry being arranged to employ a reinforcement learning process in order to dynamically alter which of the plurality of different configurations to apply as a currently selected configuration, the reinforcement learning process comprising:
maintaining a future rewards record having a plurality of entries, each entry being arranged to maintain, for an associated combination of link state and configuration, an estimated future rewards indication determined using a discounted rewards mechanism;
employing a selection policy to select a configuration for a current link state;

observing a new reward that is dependent on how the selected configuration alters a chosen performance metric for the communication link; and updating the estimated future rewards indication in the associated entry of the future rewards record in dependence on the new reward, the updating comprising, when the associated entry is first encountered following a reset event, storing in the associated entry a predicted estimated future rewards indication generated by assuming, when using the discounted rewards mechanism, that all rewards that will be used in future to update the estimated future rewards indication in the associated entry will have the same value as the new reward.

2. An apparatus as claimed in claim 1, wherein the given configuration couples each of the multiple RF processing circuits to different antenna elements.

3. An apparatus as claimed in claim 2, wherein the different antenna elements are arranged to have a same antenna polarisation.

4. An apparatus as claimed in claim 1, wherein the given configuration couples each of the multiple RF processing circuits to a same antenna element.

5. An apparatus as claimed in claim 1, wherein the configuration circuitry is further arranged when employing the reinforcement learning process to:

observe a new link state resulting from the selected configuration; and the updating comprises, when the associated entry has previously been encountered following a reset event, but at least one entry associated with the new link state has not yet been encountered following the reset event, to generate an updated estimated future rewards indication to be stored in the associated entry by combining a current estimated future rewards indication stored in the associated entry with the predicted estimated future rewards indication.

6. An apparatus as claimed in claim 5, wherein the combining comprises performing a weighted averaging of the current estimated future rewards indication stored in the associated entry and the predicted estimated future rewards indication.

7. An apparatus as claimed in claim 5, wherein the updating comprises, when the associated entry for the current link state and all active entries associated with the new link state have previously been encountered following the reset event, generating an updated estimated future rewards indication to be stored in the associated entry by combining a current estimated future rewards indication stored in the associated entry with an adjustment value determined from the new reward and the maximum estimated future rewards indication for an entry associated with the new link state.

8. An apparatus as claimed in claim 7, wherein the combining comprises performing a weighted averaging of the current estimated future rewards indication stored in the associated entry and the adjustment value.

9. An apparatus as claimed in claim 6, wherein the weighted averaging is performed using a learning rate indication such that the current estimated future rewards indication is given a higher weighting when a learning rate is lower.

10. An apparatus as claimed in claim 9, wherein the configuration circuitry is further arranged when employing the reinforcement learning process to:

perform a learning rate update operation to adjust the learning rate between upper and lower defined bounds in dependence on a difference between the current estimated future rewards indication stored in the associated entry and a predicted estimated future rewards indication.

11. An apparatus as claimed in claim 10, wherein performance of the learning rate update operation causes the learning rate to increase when the difference between the current estimated future rewards indication stored in the associated entry and the predicted estimated future rewards indication is above a threshold.

12. An apparatus as claimed in claim 10, wherein the learning rate is initialised to the lower defined bound.

13. An apparatus as claimed in claim 1, wherein the configuration circuitry is arranged to reinitialise the reinforcement learning process upon occurrence of the reset event, reinitialising of the reinforcement learning process causing at least the entries in the future rewards record to be set to an initial value.

14. An apparatus as claimed in claim 13, wherein the initial value for each valid entry is chosen so as to identify that valid entry as having not yet been encountered.

15. An apparatus as claimed in claim 13, wherein the reset event is caused by at least one of:
(i) movement of the apparatus beyond a determined threshold amount;
(ii) one or more trigger events associated with an adverse effect on link quality; and
(iii) a periodic trigger event associated with elapse of a chosen time period.

16. An apparatus as claimed in claim 1, wherein the selection policy is a behaviour policy that employs both exploitation and exploration phases based on a chosen ratio, during the exploitation phase the behaviour policy referring to the future rewards record in order to determine the selected configuration, and during the exploration phase the behaviour policy using an alternative technique to choose the selected configuration.

17. An apparatus as claimed in claim 16, wherein the chosen ratio is a link state dependent chosen ratio.

18. An apparatus as claimed in claim 16, wherein during the exploitation phase, the behaviour policy is arranged to reference the future rewards record in order to identify, from the entries associated with the current link state, an entry having the best estimated future rewards indication, and to then select the configuration associated with that identified entry.

19. An apparatus as claimed in claim 18, wherein the alternative technique comprises randomly selecting a configuration from the plurality of configurations.

20. An apparatus as claimed in claim 1, wherein the configuration circuitry is arranged, when employing the reinforcement learning process, to observe link state information for the communication link in order to determine the current link state.

21. An apparatus as claimed in claim 1, wherein the chosen performance metric is throughput.

22. An apparatus as claimed in claim 1, wherein the communication link provides a backhaul connection from the apparatus to a base station.

23. An apparatus as claimed in claim 1, wherein the configuration circuitry is arranged to perform the reinforcement learning process in order to dynamically change the configuration for:

an uplink communication path over the communication link; and both downlink and uplink communication paths over the communication link.

24. A method of operating an apparatus having a plurality of antenna elements to support radio frequency (RF) communication over a communication link using a plurality of frequency channels, and a plurality of RF processing circuits for processing RF signals, the method comprising:
- employing configuration circuitry to apply a selected configuration from a plurality of different configurations, each configuration identifying which RF processing circuit each antenna element is coupled to, and which frequency channel is allocated to each RF processing circuit, wherein the plurality of configurations includes at least one given configuration that identifies, for an uplink communication, multiple RF processing circuits that are allocated the same frequency channel, and are to be used for transmission of RF signals; and
- causing the configuration circuitry to employ a reinforcement learning process in order to dynamically alter which of the plurality of different configurations to apply as a currently selected configuration, the reinforcement learning process comprising:
  - maintaining a future rewards record having a plurality of entries, each entry being arranged to maintain, for an associated combination of link state and configuration, an estimated future rewards indication determined using a discounted rewards mechanism;
  - employing a selection policy to select a configuration for a current link state;
  - observing a new reward that is dependent on how the selected configuration alters a chosen performance metric for the communication link; and
  - updating the estimated future rewards indication in the associated entry of the future rewards record in dependence on the new reward, the updating comprising, when the associated entry is first encountered following a reset event, storing in the associated entry a predicted estimated future rewards indication generated by assuming, when using the discounted rewards mechanism, that all rewards that will be used in future to update the estimated future rewards indication in the associated entry will have the same value as the new reward.

25. An apparatus comprising;
- a plurality of antenna element means for supporting radio frequency (RF) communication over a communication link using a plurality of frequency channels;
- a plurality of RF processing means for processing RF signals; and
- configuration means for applying a selected configuration from a plurality of different configurations, each configuration identifying which RF processing means each antenna element means is coupled to, and which frequency channel is allocated to each RF processing means, wherein the plurality of configurations includes at least one given configuration that identifies, for an uplink communication, multiple RF processing means that are allocated the same frequency channel, and are to be used for transmission of RF signals the configuration means for employing a reinforcement learning process in order to dynamically alter which of the plurality of different configurations to apply as a currently selected configuration, the reinforcement learning process comprising:
  - maintaining a future rewards record having a plurality of entries, each entry being arranged to maintain, for an associated combination of link state and configuration, an estimated future rewards indication determined using a discounted rewards mechanism;
  - employing a selection policy to select a configuration for a current link state;
  - observing a new reward that is dependent on how the selected configuration alters a chosen performance metric for the communication link; and
  - updating the estimated future rewards indication in the associated entry of the future rewards record in dependence on the new reward, the updating comprising, when the associated entry is first encountered following a reset event, storing in the associated entry a predicted estimated future rewards indication generated by assuming, when using the discounted rewards mechanism, that all rewards that will be used in future to update the estimated future rewards indication in the associated entry will have the same value as the new reward.

* * * * *